United States Patent
Chu et al.

(10) Patent No.: US 10,469,809 B2
(45) Date of Patent: Nov. 5, 2019

(54) PROJECTOR AND LIGHT SOURCE MODULE

(71) Applicant: Coretronic Corporation, Hsin-Chu (TW)

(72) Inventors: Wen-Hao Chu, Hsin-Chu (TW); Wei-Min Chien, Hsin-Chu (TW); Yi-Han Lai, Hsin-Chu (TW); Jih-Ching Chang, Hsin-Chu (TW); Te-Tang Chen, Hsin-Chu (TW); Sheng-Yan Wang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/119,826

(22) Filed: Aug. 31, 2018

(65) Prior Publication Data

US 2019/0068932 A1    Feb. 28, 2019

(30) Foreign Application Priority Data

Aug. 31, 2017  (CN) .......................... 2017 1 0767666

(51) Int. Cl.
| | |
|---|---|
| *F21V 29/00* | (2015.01) |
| *H04N 9/31* | (2006.01) |
| *G03B 21/16* | (2006.01) |
| *H01J 7/24* | (2006.01) |
| *G03B 21/20* | (2006.01) |
| *G03B 21/00* | (2006.01) |

(52) U.S. Cl.
CPC ............ *H04N 9/315* (2013.01); *G03B 21/16* (2013.01); *H01J 7/24* (2013.01); *H04N 9/3144* (2013.01); *G03B 21/005* (2013.01); *G03B 21/2066* (2013.01)

(58) Field of Classification Search
None
See application file for complete search history.

(56) References Cited

U.S. PATENT DOCUMENTS

| | | | |
|---|---|---|---|
| 7,972,013 B2 | 7/2011 | Soma et al. | |
| 8,820,938 B2 | 9/2014 | Tanaka et al. | |
| 8,919,964 B2 | 12/2014 | Miyata | |
| 9,285,663 B2 | 3/2016 | Yamashita | |
| 9,335,615 B2 | 5/2016 | Tateno | |
| 9,366,947 B2 | 6/2016 | Miyata | |
| 2008/0218050 A1 | 9/2008 | Soma et al. | |
| 2011/0216287 A1 | 9/2011 | Kitamura et al. | |
| 2011/0234978 A1 | 9/2011 | Hammer et al. | |
| 2012/0242962 A1 | 9/2012 | Miyata | |
| 2015/0077718 A1 | 3/2015 | Miyata | |
| 2016/0259233 A1 | 9/2016 | Miyata et al. | |
| 2017/0248808 A1 | 8/2017 | Hsu | |

*Primary Examiner* — Vip Patel

(57) ABSTRACT

A light source module includes a light source having an optical axis, a fan for providing a cooling airflow and a deflector disposed between the light source and the fan and directing a flowing direction of the cooling airflow. The deflector includes a first air duct connected between a first side of the light source and an air outlet of the fan, a second air duct connected between a second side of the light source and the air outlet of the fan, and a first airflow control assembly controlling the first air duct in a communicating state or a non-communicating state and having a first control shaft and a first airflow passing portion rotating about the first control shaft. The first control shaft is inclined to the optical axis so that a first angle is formed therebetween. The first angle is between 0 and 90 degrees.

34 Claims, 15 Drawing Sheets

PROJECTOR AND LIGHT SOURCE MODULE

CROSS-REFERENCE TO RELATED APPLICATION

This application claims the priority benefit of China application (CN201710767666.3 filed on 2017 Aug. 31). The entirety of the above-mentioned patent application is hereby incorporated by reference herein and made a part of this specification.

FIELD OF THE INVENTION

The invention relates to a projector, and more particularly to a projector having a light source module.

BACKGROUND OF THE INVENTION

With the development of science and technology, the projector has an increasingly wider range of applications and it is no longer limited to be installed on the table top or by ceiling mount manner. When a picture is needed to be projected onto a ceiling or floor, the projector must be installed in a manner enabling an upward projection or downward projection. When a picture is needed to be displayed in portrait direction, the projector is required to be installed in a portrait-mode or beam-up/beam-down manner. For a projector employing a high pressure mercury lamp as a light source, there are different cooling ways for the lamp depending on the different manners in which the projector is installed (for example, on a table top, by the ceiling mount manner, upward/downward projection, portrait mode or beam-up/beam-down manner, etc.), so as to achieve a certain lifetime of the lamp. When installed in different manners (such as those manners described above), a projector requires different cooling conditions for its lamp. Therefore, changing the installation manner of a projector whenever the projection angle is required to be switched may result poor cooling and may further compromise the lifetime of the lamp significantly. For the occasion where the projection angle needs to be frequently switched, how to resolve the above-mentioned problems remains a focus of interest for those ordinarily skilled in the art.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

One of the objectives of the invention is to provide a projector, wherein the light source module thereof can cause a desiredcooling effect in various use statuses, thereby increasing the lifetime of the projector and its light source module.

Another objective of the invention to provide a light source module which may cause a desired cooling effect in various use statuses, thereby increasing the lifetime of the light source module.

Other advantages of the invention may be further understood from the technical features disclosed herein.

In order to achieve one of or part of or all of the above objectives or other objectives, the invention provides a projector, which includes a light source module, a light valve and a lens. The light source module includes a light source, a fan and a deflector. The light source has an optical axis and may provide an illumination beam. The fan may provide a cooling airflow. The deflector is disposed between the light source and the fan and may be configured to direct a flowing direction of the cooling airflow. The deflector includes a first air duct, a second air duct and a first airflow control assembly. The first air duct is connected between a first side of the light source and an air outlet of the fan. The second air duct is connected between a second side of the light source and the air outlet of the fan. The first airflow control assembly may be configured to control the first air duct to be in a communicating state or a non-communicating state and may have a first control shaft and a first airflow passing portion. The first airflow passing portion is configured to rotate about the first control shaft. The first control shaft is inclined to the optical axis so that a first angle is formed between the first control shaft and the optical axis. The first angle is greater than 0 and less than 90 degrees. When the first air duct is in the communicating state, the first airflow passing portion is located on a passing path of the cooling airflow so that the cooling airflow flows from the fan to the light source via the first air duct. The light valve is located on a transmission path of the illumination beam and is configured to convert the illumination beam into an image beam. The lens is located on a transmission path of the image beam, and the image beam converts to a projection beam after passing through the lens.

In order to achieve one of or part of or all of the above objectives or other objectives, the invention further provides a light source module used for a projector. The light source module includes a light source, a fan and a deflector. The light source has an optical axis. The fan is configured to provide a cooling airflow. The deflector is disposed between the light source and the fan and is configured to direct a flowing direction of the cooling airflow. The deflector includes a first air duct, a second air duct and a first airflow control assembly. The first air duct is connected between a first side of the light source and an air outlet of the fan. The second air duct is connected between a second side of the light source and the air outlet of the fan. The first airflow control assembly is configured to control the first air duct to be in a communicating state or a non-communicating state and has a first control shaft and a first airflow passing portion. The first airflow passing portion is configured to rotate about the first control shaft. The first control shaft is inclined to the optical axis so that a first angle is formed between the first control shaft and the optical axis. The first angle is greater than 0 and less than 90 degrees. When the first air duct is in the communicating state, the first airflow passing portion is located on a passing path of the cooling airflow so that the cooling airflow flows from the fan to the light source via the first air duct.

In summary, according to the projector of the embodiment of the invention, the light source module has a first airflow control assembly for controlling the first air duct to be in a communicating state or a non-communicating state. With the first control shaft of the first airflow control assembly being inclined to the optical axis so that the angle between the first control shaft and the optical axis is greater than 0 and less than 90 degrees, the cooling airflow provided by the fan can be directed to the light source module in various use statuses. As a result, the projector can cause a desired cooling effect on the light source module in various use statuses, thereby increasing the lifetime of the light source module and the projector.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
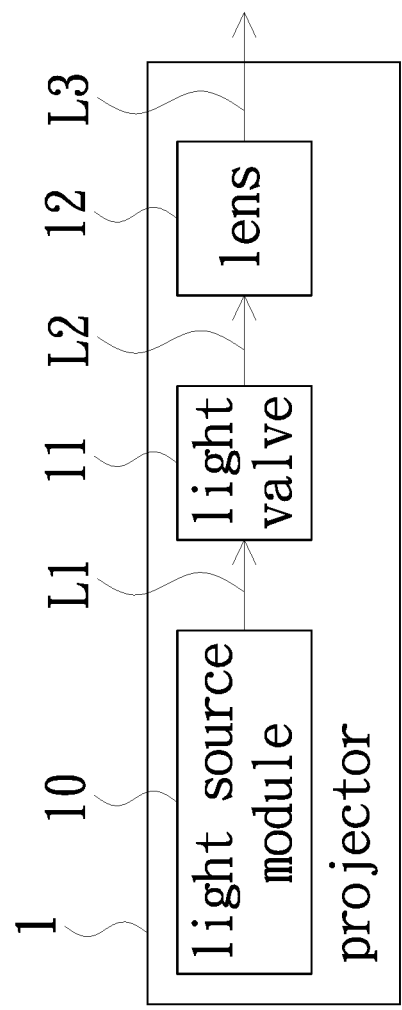
FIG. 1 is a functional block diagram of a projector in accordance with an embodiment of the invention.

FIG. 1 is a functional block diagram of a projector in accordance with an embodiment of the invention. As shown in FIG. 1, the projector 1 of the embodiment includes a light source module 10, a light valve 11 and a lens 12. The light source module 10 is configured to provide an illumination beam L1. The light valve 11 is located on the transmission path of the illumination beam L1 and is configured to convert the illumination beam L1 into an image beam L2. The lens 12 is located on the transmission path of the image beam L2 and the image beam L2 converts to a projection beam L3 after passing through the lens 12. In the embodiment, the lens 12 may project the projection beam L3 out the projector 1. The lens 12 may be a lens. The lens may have a plurality of glass/plastic lenses. In the embodiment, the light valve 11 may be a digital micro-mirror device (DMD), a liquid crystal on silicon (LCoS) or a liquid crystal display (LCD), but the invention is not limited thereto.

Figure 2:
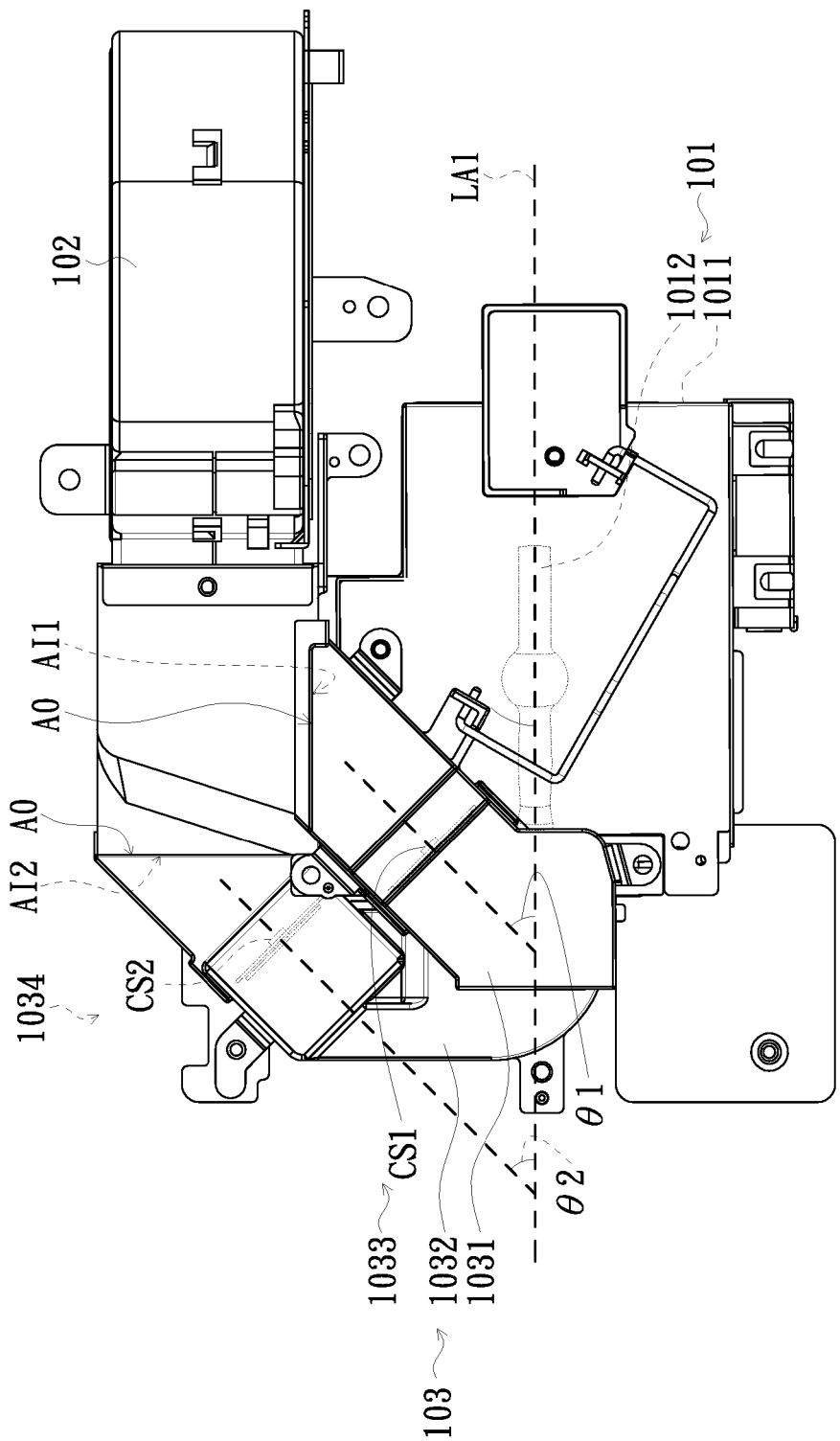
FIG. 2 is a schematic top view of a light source module in accordance with an embodiment of the invention.
Figure 3:
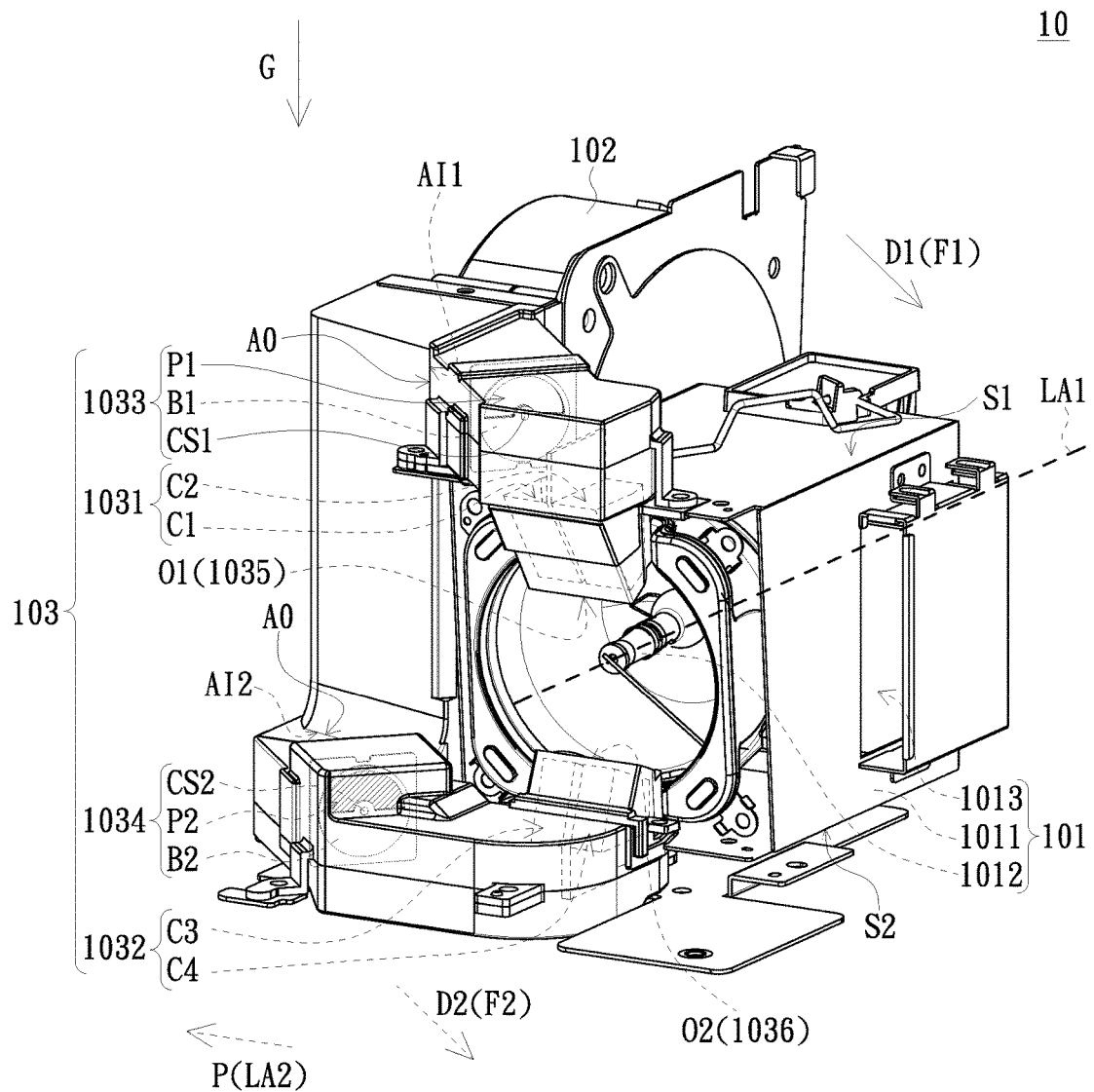
FIG. 3 is a schematic perspective structural view of a light source module in accordance with embodiment of the invention.

FIG. 2 is a schematic top view of a light source module in accordance with an embodiment of the invention. FIG. 3 is a schematic perspective structural view of a light source module in accordance with embodiment of the invention. As shown in FIGS. 1, 2 and 3, the light source module 10 of the embodiment includes a light source 101, a fan 102 and a deflector 103. The light source 101 has an optical axis LA1, and the light source 101 is used for providing the illumination beam L1. In one embodiment, the lens 12 provides the projection beam L3 in a projection direction P, and the projection direction P is, for example, the extending direction of the light axis LA2 of the lens 12, but the invention is not limited thereto. In one embodiment, the optical axis LA1 of the light source 101 is, for example, perpendicular to the light axis LA2 of the lens 12, but the invention is not limited thereto. The fan 102 is used for providing a cooling airflow. The deflector 103 is disposed between the light source 101 and the fan 102, and the deflector 103 is used for directing the flowing direction of the cooling airflow provided by the fan 102. In the embodiment, the deflector 103 includes a first air duct 1031, a second air duct 1032 and a first airflow control assembly 1033. In the embodiment, the first air duct 1031 is connected between the first side S1 of the light source 101 and the air outlet A0 of the fan 102, the second air duct 1032 is connected between the second side S2 of the light source 101 and the air outlet A0 of the fan 102, and the second side S2 is opposite to the first side S1 for example. The first airflow control assembly 1033 has a first control shaft CS1 and a first airflow passing portion P1, and the first airflow passing portion P1 is used for rotating about the first control shaft CS1. The first control shaft CS1 is inclined to the optical axis LA1, so that a first angle θ1 greater than 0 and less than 90 degrees is formed between the first control shaft CS1 and the optical axis LA1. In the embodiment, the first airflow control assembly 1033 is disposed in the first air duct 1031 and is used for controlling the first air duct 1031 to be in a communicating state or a non-communicating state. In the embodiment, when the first air duct 1031 is in a communicating state, the first airflow passing portion P1 of the first airflow control assembly 1033 is located on the passing path of the cooling airflow so that the cooling airflow flows from the fan 102 to the light source 101 via the first air duct 1031.

In the embodiment, when the first air duct 1031 is in a non-communicating state, the first airflow control assembly 1033 may block the flow of cooling airflow from the fan 102 to the light source 101 so that the cooling airflow does not flow from the fan 102 to the light source 101 via the first air duct 1031. Specifically, in the embodiment, the first airflow control assembly 1033 further has a first airflow blocking portion B1. The first airflow blocking portion B1 is connected to the first airflow passing portion P1. The first airflow blocking portion B1 is used for rotating about the first control shaft CS1. The first airflow passing portion P1 and the first airflow blocking portion B1 are both positioned around the first control shaft CS1, but the invention is not limited thereto. In the embodiment, when the first air duct 1031 is in a non-communicating state, the first airflow blocking portion B1 of the first airflow control assembly 1033 may be located on the passing path of the cooling airflow so that the cooling airflow cannot flow from the fan 102 to the light source 101 via the first air duct 1031.

In the embodiment, the deflector 103 may optionally include a second airflow control assembly 1034. The second airflow control assembly 1034 has a second control shaft CS2, a second airflow passing portion P2 and a second airflow blocking portion B2, but the invention is not limited thereto. In the embodiment, the second airflow passing portion P2 is connected to the second airflow blocking portion B2. The second airflow passing portion P2 is used for rotating about the second control shaft CS2. The second airflow blocking portion B2 is used for rotating about the second control shaft CS2. That is, the second airflow passing portion P2 and the second airflow blocking portion B2 are both positioned around the second control shaft CS2, but the invention is not limited thereto. In the embodiment, the second control shaft CS2 is inclined to the optical axis LA1, so that a second angle θ2 greater than 0 and less than 90 degrees is formed between the second control shaft CS2 and the optical axis LA1, but the invention is not limited thereto. In the embodiment, the second airflow control assembly 1034 is disposed in the second air duct 1032, and the second airflow control assembly 1034 is used for controlling the second air duct 1032 to be in a communicating state or a non-communicating state. In the embodiment, when the second air duct 1032 is in a communicating state, the second airflow passing portion P2 of the second airflow control assembly 1034 is located on the passing path of the cooling airflow so that the cooling airflow flows from the fan 102 to the light source 101 via the second air duct 1032, and the first air duct 1031 is in a non-communicating state. In the embodiment, when the second air duct 1032 is in a non-communicating state, the second airflow control assembly 1034 may block the flow of the cooling airflow from the fan 102 to the light source 101 so that a cooling airflow does not flow from the fan 102 to the light source 101 via the second air duct 1032. Specifically, in the embodiment, when the second air duct 1032 is in a non-communicating state, the second airflow blocking portion B2 of the second airflow control assembly 1034 may be located on the passing path of the cooling airflow so that the cooling airflow cannot flow from the fan 102 to the light source 101 via the second air duct 1032. Meanwhile, the first air duct 1031 is in a communicating state, that is, the cooling airflow flows from the fan 102 to the light source 101 via the first air duct 1031.

In the embodiment, the valves of the first angle θ1 and/or the second angle θ2 are, for example, 45 degrees respectively, but the invention is not limited thereto. The valves of the first angle θ1 and the second angle θ2 can be selected from the range of greater than 0 and less than 90 degrees as desired in the actual situation.

In the embodiment, the aforementioned first control shaft CS1 and the second control shaft CS2 may be pivot mechanism components as known or recognized by those skilled in the art, but the invention is not limited thereto. In addition, in one embodiment, the first airflow blocking portion B1 may be a first rotary member pivotally connected to the first control shaft CS1, and the second airflow blocking portion B2 may be a second rotary member pivotally connected to the second control shaft CS2. In addition, in the embodiment, the first airflow blocking portion B1 and the first airflow passing portion P1 may constitute the first rotary member to be pivotally connected to the first control shaft CS1, and the second airflow blocking portion B2 and the second airflow passing portion P2 may constitute the second rotary member to be pivotally connected to the second control shaft CS2. However, such a structural design is merely an embodiment of the invention, and the invention is not limited thereto. In other non-illustrated embodiments, the first control shaft CS1 and the second control shaft CS2 may not be pivot devices for example. For example, the first control shaft CS1 is a rotation axis around which the first airflow blocking portion B1 and the first airflow passing portion P1 are positioned, and the second control shaft CS2 is a rotation axis around which the second airflow blocking portion B2 and the second airflow passing portion P2 are positioned. More specifically, in the embodiment where the first control shaft CS1/second control shaft CS2 is not a pivot device, the first airflow blocking portion B1 and the first airflow passing portion P1 may constitute a first sliding member for example, the second airflow blocking portion B2 and the second airflow passing portion P2 may constitute a second sliding member for example, and the first sliding member/second sliding member is slidable on a ring rail.

In other embodiments, the rotation of the first control shaft CS1 and/or the second control shaft CS2 may be driven by means of employing a driving motor to drive a gear assembly, so as to drive/assist the first control shaft CS1 and/or the second control shaft CS2 to rotate, so that the first air duct 1031/second air duct 1032 can be caused accurately to be in a communicating state or a non-communicating state, though the invention is not limited thereto. In addition, the deflector 103 which has two air ducts (the first air duct 1031 and the second air duct 1032) is merely an embodiment of the invention, and the invention is not limited thereto. The number of air duct disposed in the deflector 103 may be increased to three or more as desired in the actual situation.

In the embodiment, the first airflow control assembly 1033 controls the first air duct 1031 to be in a communicating state or a non-communicating state by gravity for example. As shown in FIG. 3, in the embodiment, the first airflow blocking portion B1 and the first airflow passing portion P1 collectively constitute, for example, the first rotary member pivotally connected to the first control shaft CS1. As a result, the first airflow blocking portion B1 can be rotated around the first control shaft CS1 by gravity in various use statuses. Specifically, in the embodiment, the first air duct 1031 is in a non-communicating state when the first airflow blocking portion B1 is rotated to be located on the passing path of the cooling airflow as controlled by gravity. Alternatively, the first air duct 1031 is in a communicating state when the first airflow blocking portion B1 is rotated, as controlled by gravity, such that it does not block the passing path or a portion of the passing path of the cooling airflow. Similarly, in the embodiment, the second airflow control assembly 1034 controls the second air duct 1032 to be in a communicating state or a non-communicating state by gravity for example. In the embodiment, the second airflow blocking portion B2 and the second airflow passing portion P2 collectively constitute, for example, the second rotary member pivotally connected to the second control shaft CS2. As a result, the second airflow blocking portion B2 can be rotated about the second control shaft CS2 by gravity in various use statuses. Specifically, in the embodiment, the second air duct 1032 is in a non-communicating state when the second airflow blocking portion B2 is rotated to be located on the passing path of the cooling airflow as controlled by gravity. Alternatively, the second air duct 1032 is in a communicating state when the second airflow blocking portion B2 is rotated, as controlled by gravity, such that it does not block the passing path or a portion of the passing path of the cooling airflow. In the embodiment, the extending direction D1 of the first control shaft CS1 is parallel to the flowing direction F1 of the cooling airflow in the first air duct 1031, and the extending direction D2 of the second control shaft CS2 is parallel to the flowing direction F2 of the cooling airflow in the second air duct 1032. In such a structural design of the embodiment, the first airflow blocking portion B1 or the second airflow blocking portion B2 can substantially block the passing of the cooling airflow when the first airflow blocking portion B1 or the second airflow blocking portion B2 is rotated, as controlled by gravity, to be located on the passing path of the cooling airflow.

Figure 4:
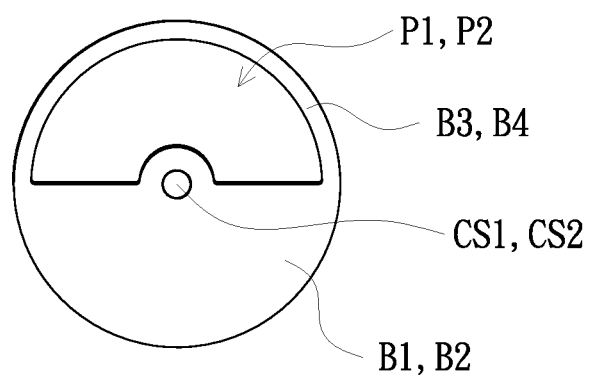
FIG. 4 is a schematic structural view of a first airflow control assembly and a second airflow control assembly in accordance with another embodiment of the invention.

In the embodiment as shown in FIG. 4, the first airflow control assembly 1033 has a first airflow blocking portion B1 and an extending portion B3, the second airflow control assembly 1034 has a second airflow blocking portion B2 and an extending portion B4, the first airflow blocking portion B1 is connected to the extending portion B3, and the second airflow blocking portion B2 is connected to the extending portion B4. In the embodiment, the first airflow blocking portion B1 and the second airflow blocking portion B2 of the second airflow control assembly 1034 are both semicircular physical members for example, the first airflow passing portion P1 is an opening surrounded by the first airflow blocking portion B1 and the extending portion B3 for example, and the second airflow passing portion P2 is an opening surrounded by the second airflow blocking portion B2 and the extending portion B4 for example, wherein the extending portions B3 and B4 are semi-curved for example, but the invention is not limited thereto. In other non-illustrated embodiments, the first airflow control assembly 1033 may not have an extending portion B3, and the second airflow control assembly 1034 may not have an extending portion B4. More specifically, in the embodiment in which the extending portions B3 and B4 are not provided, the first airflow blocking portion B1 and the second airflow blocking portion B2 are physical members respectively, and the first airflow passing portion P1 and the second airflow passing portion P2 are non-physical members respectively, that is, the first airflow blocking portion B1 and the second airflow blocking portion B2 are semicircular physical members for example, and the first airflow passing portion P1 and the second airflow passing portion P2 are non-physical members respectively (e.g., openings) indicated by arrows, but the invention is not limited thereto. In addition, in other embodiments, the first airflow blocking portion B1 and the second airflow blocking portion B2 are a first sliding member and a second sliding member sliding along a ring rail for example respectively, wherein the first control shaft CS1/second control shaft CS2 is not a pivot device, the first control shaft CS1 is a rotation axis around which the first airflow blocking portion B1 and the first airflow passing portion P1 are positioned for example, and the second control shaft CS2 is a rotation axis around which the second airflow blocking portion B2 and the second air flow passing portion P2 are positioned for example.

As shown in FIG. 3, the deflector 103 of the embodiment may optionally include a first deflector unit 1035 and a second deflector unit 1036, but the invention is not limited thereto. In the embodiment, the first deflector unit 1035 is disposed between the first air duct 1031 and the light source 101, and the first deflector unit 1035 has a first air outlet portion O1 directed to the light source 101. In the embodiment, the second deflector unit 1036 is disposed between the second air duct 1032 and the light source 101, and the second deflector unit 1036 has a second air outlet portion O2 directed to the light source 101. Specifically, in the embodiment, the first deflector unit 1035 communicates with the first air duct 1031, and the second deflector unit 1036 communicates with the second air duct 1032. The first deflector unit 1035 acts to direct the cooling airflow flowing through the first air duct 1031 to the light source 101 via the first air outlet portion O1, and the second deflector unit 1036 acts to direct the cooling airflow flowing through the second air duct 1032 to the light source 101 via the second air outlet portion O2.

In one embodiment, the first air outlet portion O1 of the first deflector unit 1035 and the second air outlet portion O2 of the second deflector unit 1036 are disposed in a face-to-face manner with respect to the light emitting element 1012 of the light source 101 (with the gravitational direction as the reference direction), such that the temperature at the upper end of the light emitting element 1012 can be effectively lowered. However, the invention is not such limited.

In one embodiment, a movable member which may assist in effecting the diversion may be provided at the first air outlet portion O1 of the first deflector unit 1035 for example, and another movable member which may assist in effecting the diversion may be provided at the second air outlet portion O2 of the first deflector unit 1035 for example. However, the invention is not such limited and movable members may be provided as required in actual situation.

In the embodiment as shown in FIG. 3, the first air duct 1031 may optionally include a first channel C1 and a second channel C2, and the air outlet of the first channel C1 and the air outlet of the second channel C2 are positioned respectively at the opposite sides of the optical axis LA1, but the invention is not limited thereto. Similarly, in the embodiment, the second air duct 1032 may optionally include a third channel C3 and a fourth channel C4, and the air outlet of the third channel C3 and the air outlet of the fourth channel C4 are positioned respectively at the opposite sides of the optical axis LA1, but the invention is not limited thereto. In addition, in the embodiment, the air outlet of the first channel C1 is opposite to the air outlet of the third channel C3, and the air outlet of the second channel C2 is opposite to the air outlet of the fourth channel C4. However, the invention is not such limited.

As shown in FIGS. 2 and 3, in the embodiment, the light source 101 may optionally include a housing 1011 and a light emitting element 1012 disposed in the housing 1011, but the invention is not limited thereto. In the embodiment, the housing 1011 has at least one opening 1013. In the embodiment, the cooling airflow provided by the fan 102 is first directed to the light emitting element 1012 in the housing 1011 by the deflector 103 and then is evacuated via at least one opening 1013. In addition, in the embodiment, the first air duct 1031 is connected between the first side S1 of the light source 101 and the air outlet A0 of the fan 102, and the second air duct 1032 is connected between the second side S2 of the light source 101 and the air outlet A0 of the fan 102. In the embodiment, the first side S1 and the second side S2 are located on the opposite sides of the housing 1011 respectively, the air inlet AI1 of the first air duct 1031 and the air inlet AI2 of the second air duct 1032 are both connected to the air outlet A0 of the fan 102 for example, the first air duct 1031 and the second air duct 1032 are connected to the opposite sides of the housing 1011 of the light source 101 respectively, but the invention is not limited thereto. In other non-illustrated embodiments, the first side S1 and the second side S2 are located on the adjacent sides of the housing 1011 respectively, the first air duct 1031 and the second air duct 1032 are connected to the adjacent sides of the housing 1011 of the light source 101 respectively, but the invention is not limited thereto.

The following description describes how the cooling airflow provided by the fan 102 is directed by the deflector 103 when the projector 1 is used in various statuses.

Figure 5:
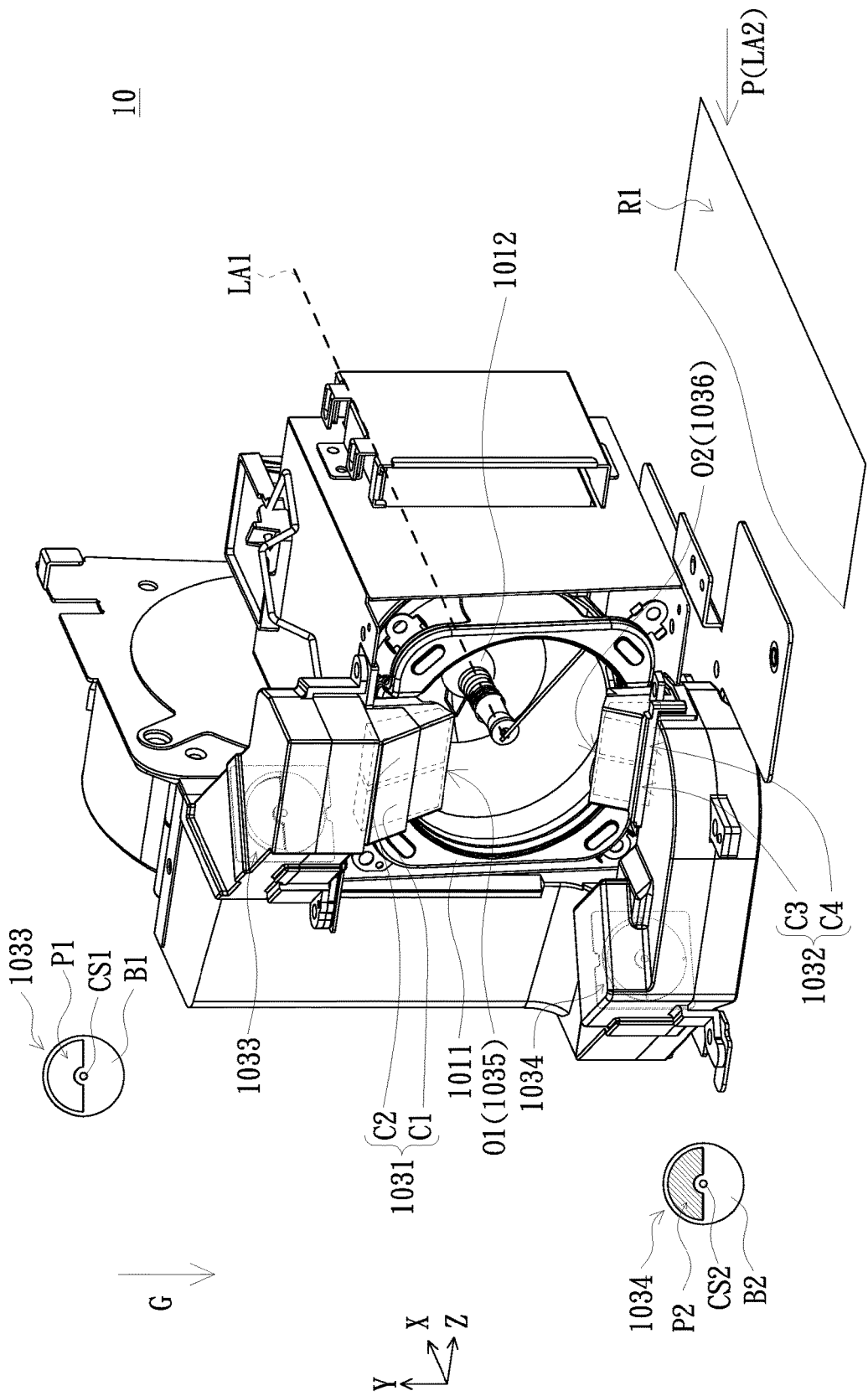
FIG. 5 is a schematic perspective structural view of the light source module shown in FIG. 3 in a use status.

FIG. 5 is a schematic perspective structural view of the light source module shown in FIG. 3 in a use status. Referring to FIGS. 1, 3 and 5, in the embodiment, when the projector 1 is fixed with respect to the reference plane R1 of a table top for example, the second air duct 1032 of the deflector 103 is located between the reference plane R1 and the optical axis LA1 of the light source 101 for example, and the optical axis LA1 of the light source 101 is parallel to the reference plane R1 for example. However, the invention is not so limited. Specifically, in the embodiment, the second air duct 1032 is located between the reference plane R1 and the first air duct 1031 for example, and the extending direction of a portion of the first air duct 1031 and the extending direction of a portion of the second air duct 1032 are substantially parallel to the reference plane R1 for example. However, the invention is not such limited. In the embodiment, the projection direction P (i.e., the light axis LA2) of the projection beam L3 provided by the lens 12 of the projector 1 is perpendicular to the gravitational direction G. In such a use status of the embodiment, the first airflow blocking portion B1 of the first airflow control assembly 1033 can be controlled by gravity and rotated with the first control shaft CS1 as a rotation axis so that the first airflow passing portion P1 is rotated to be located on the passing path of the cooling airflow, thereby causing the first air duct 1031 to be in a communicating state. Meanwhile, the second airflow blocking portion B2 of the second airflow control assembly 1034 can be controlled by gravity and rotated to be located on the passing path of the cooling airflow with the second control shaft CS2 as the rotation axis, thereby causing the second air duct 1032 to be in a non-communicating state. As described above, in the use status of the light source module 10 in the embodiment of FIG. 5, the first channel C1 and the second channel C2 of the first air duct 1031 both are in a communicating state, and the third channel C3 and the fourth channel C4 of the second air duct 1032 both are in a non-communicating state. Thus, in the embodiment, the cooling airflow provided by the fan 102 can flow to the light emitting element 1012 of the light source 101 via the first air duct 1031 to cool the light emitting element 1012. In the above embodiment, the projector 1 is exemplified by being fixed with respect to the reference plane R1. However, the projector 1 may be fixed to a ceiling or at other suitable positions, that is, the position where the projector is fixed is not limited in the invention.

In the embodiment shown in FIG. 5, in the gravitational direction, hot air is accumulated at the upper end of the light emitting element 1012 for example, so that the hot spot is located at the upper end of the light emitting element 1012 for example. However, from above description, it is known that in the embodiment, with the second air duct 1032 in a non-communicating state, the cooling airflow may flow above the light emitting element 1012 of the light source 101 shown in FIG. 5 via the first air duct 1031 which is in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 6:
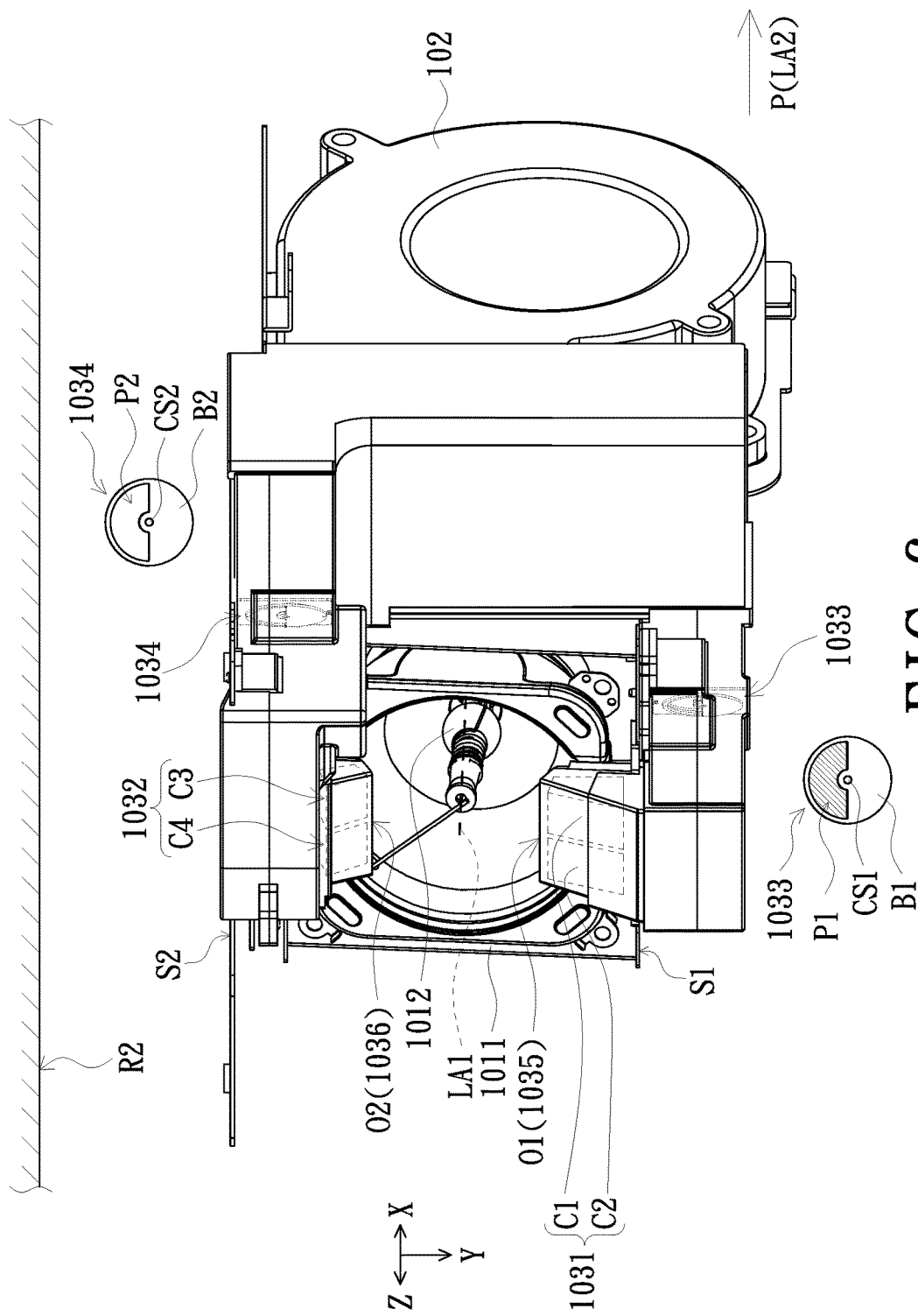
FIG. 6 is a schematic perspective structural view of the light source module shown in FIG. 3 in another use status.

FIG. 6 is a schematic perspective structural view of the light source module shown in FIG. 3 in another use status. Referring to FIGS. 1, 3 and 6, in the embodiment, when the projector 1 is fixed with respect to the reference plane R2 of a ceiling for example, the second air duct 1032 of the deflector 103 is located between the reference plane R2 and the optical axis LA1 of the light source 101 for example, and the optical axis LA1 of the light source 101 is parallel to the reference plane R2 for example. However, the invention is not such limited. Specifically, in the embodiment, the second air duct 1032 is located between the reference plane R2 and the first air duct 1031 for example, and the extending direction of a portion of the first air duct 1031 and the extending direction of a portion of the second air duct 1032 are substantially parallel to the reference plane R2 for example. However, the invention is not such limited. In the embodiment, the projection direction P (i.e., the light axis LA2) of the projection beam L3 provided by the lens 12 of the projector 1 is perpendicular to the gravitational direction G. In such a use status of the embodiment, the first airflow blocking portion B1 of the first airflow control assembly 1033 can be controlled by gravity and rotated to be located on the passing path of the cooling airflow with the first control shaft CS1 as the rotation axis, thereby causing the first air duct 1031 to be in a non-communicating state. Meanwhile, the second airflow blocking portion B2 of the second airflow control assembly 1034 can be controlled by gravity with the second control shaft CS2 as a rotation axis so that the second airflow passing portion P2 is rotated to be located on the passing path of the cooling airflow, thereby causing the second air duct 1032 to be in a communicating state. From above description, it is known that in the use status of the light source module 10 in the embodiment of FIG. 6, the first channel C1 and the second channel C2 of the first air duct 1031 both are in a non-communicating state, and the third channel C3 and the fourth channel C4 of the second air duct 1032 both are in a communicating state. Thus, in the embodiment, the cooling airflow provided by the fan 102 can flow to the light emitting element 1012 of the light source 101 via the second air duct 1032 to cool the light emitting element 1012. In the above embodiment, the projector 1 is exemplified by being fixed with respect to the reference plane R2. However, the projector 1 may be fixed to a table top or at other suitable positions, that is, the position where the projector is fixed is not limited in the invention.

In the embodiment shown in FIG. 6, in the gravitational direction, hot air is accumulated at the upper end of the light emitting element 1012 for example, so that the hot spot is located at the upper end of the light emitting element 1012 for example. From above description, it is known that in the embodiment, with the first air duct 1031 in a non-communicating state, the cooling airflow may flow above the light emitting element 1012 of the light source 101 shown in FIG. 6 via the second air duct 1032 which is in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 7:
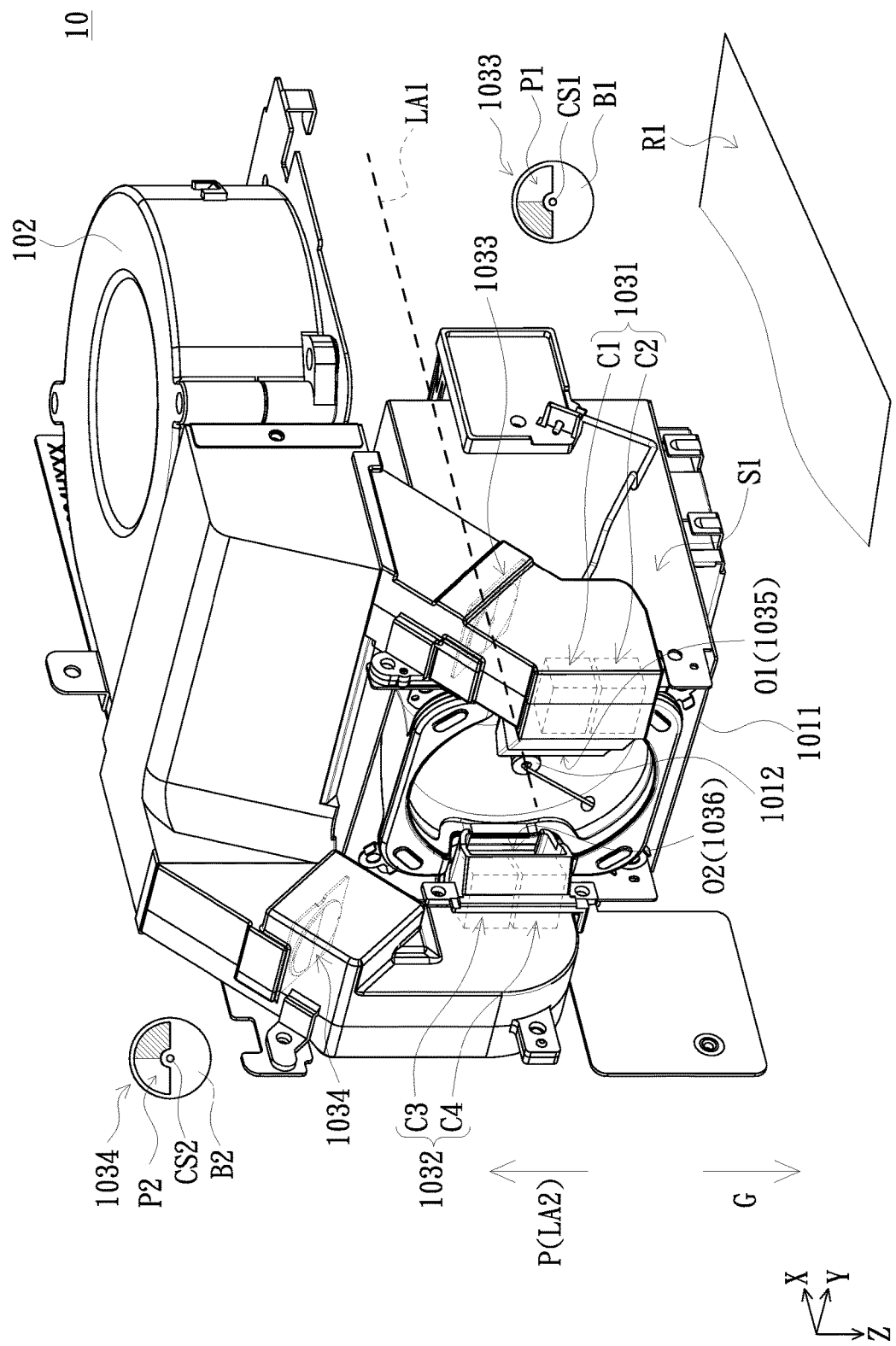
FIG. 7 is a schematic perspective structural view of the light source module shown in FIG. 3 in still another use status.

FIG. 7 is a schematic perspective structural view of the light source module shown in FIG. 3 in still another use status. Referring to FIGS. 1, 3 and 7, in the embodiment, when the projector 1 is fixed with respect to the reference plane R1 of a table top for example, the first air duct 1031 and the second air duct 1032 are located above the reference plane R1 for example, a portion of the first air duct 1031 is located between the reference plane R1 and a portion of the second air duct 1032 for example, a portion of the second air duct 1032 is located between the reference plane R1 and a portion of the first air duct 1031 for example, and the optical axis LA1 of the light source 101 is parallel to the reference plane R1 for example. However, the invention is not such limited. Specifically, in the embodiment, the extending direction of the first air duct 1031 and the extending direction of the second air duct 1032 are not parallel to the reference plane R1 for example, but the invention is not limited thereto. In the embodiment, the projection direction P (i.e., the light axis LA2) of the projection beam L3 provided by the lens 12 of the projector 1 is parallel to the gravitational direction G. In such a use status of the embodiment, the first airflow blocking portion B1 of the first airflow control assembly 1033 can be controlled by gravity and rotated with the first control shaft CS1 as a rotation axis so that the first airflow passing portion P1 is rotated to be located on the passing path of the cooling airflow, thereby causing the first channel C1 of the first air duct 1031 to be in a communicating state and the second channel C2 to be in a non-communicating state. Meanwhile, the second airflow blocking portion B2 of the second airflow control assembly 1034 can be controlled by gravity and rotated with the second control shaft CS2 as a rotation axis so that a portion of the second airflow passing portion P2 is rotated to be located on the passing path of the cooling airflow, thereby causing the third channel C3 of the second air duct 1032 to be in a communicating state and the fourth channel C4 to be in a non-communicating state. Thus, in the embodiment, the cooling airflow provided by the fan 102 can flow to the light emitting element 1012 of the light source 101 individually via a portion of the first air duct 1031 and a portion of the second air duct 1032 to cool the light emitting element 1012. In the above embodiment, the projector 1 is exemplified by being fixed with respect to the reference plane R1 However, the projector 1 may be fixed to a ceiling or at other suitable positions, that is, the position where the projector is fixed is not limited in the invention.

In the embodiment shown in FIG. 7, hot air is accumulated at the right upper end and the left upper end of the light emitting element 1012 for example, so that the hot spot is located at the right upper end and the left upper end of the light emitting element 1012 for example. From above description, it is known that in the embodiment, the cooling airflow may flow to the right upper end and the left upper end of the light emitting element 1012 of the light source 101 shown in FIG. 7 via the first channel C1 of the first air duct 1031 in a communicating state and the third channel C3 of the second air duct 1032 in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 8:
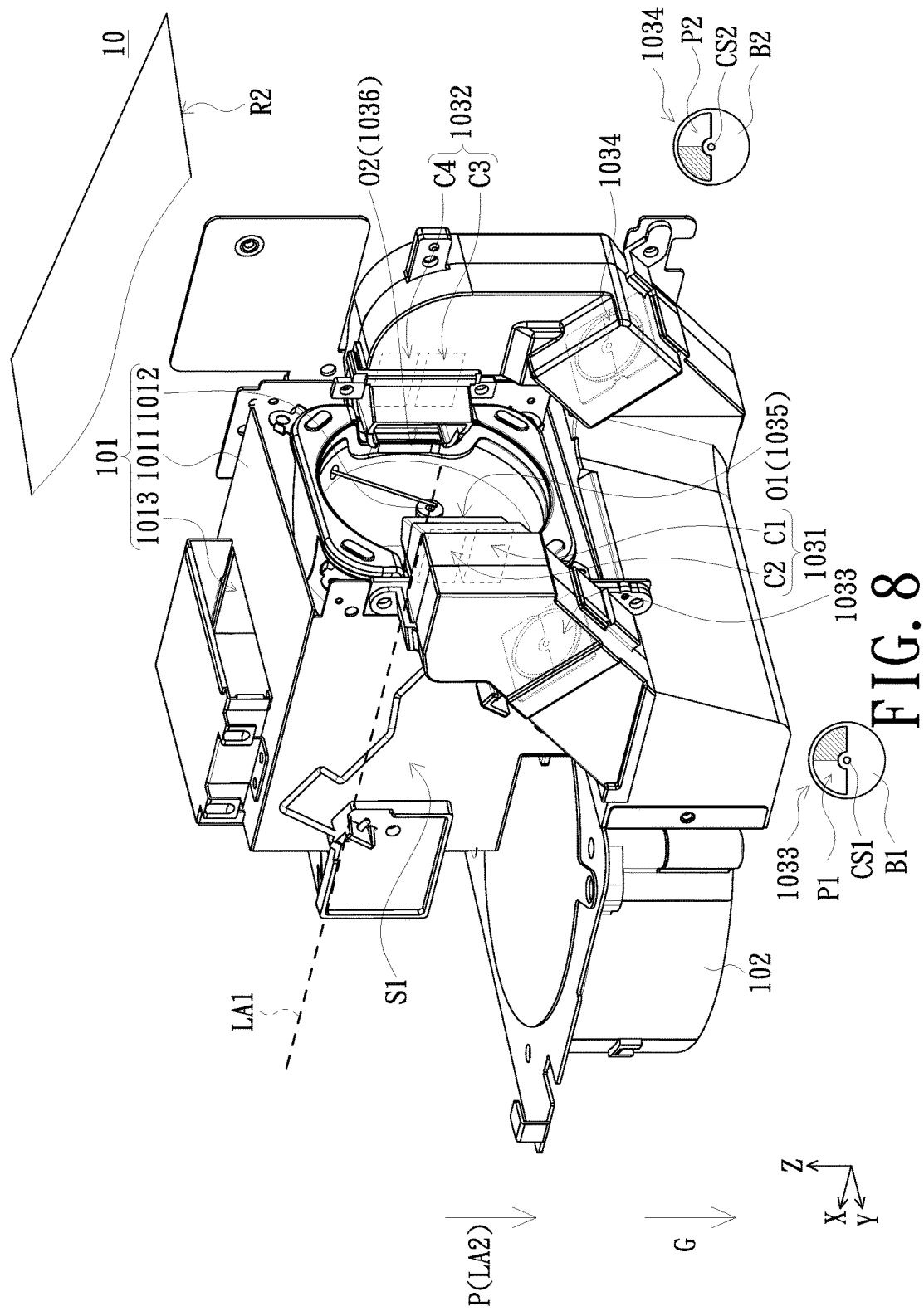
FIG. 8 is a schematic perspective structural view of the light source module shown in FIG. 3 in still another use status.

FIG. 8 is a schematic perspective structural view of the light source module shown in FIG. 3 in still another use status. Referring to FIGS. 1, 3 and 8, in the embodiment, when the projector 1 is fixed with respect to the reference plane R2 of a ceiling for example, the first air duct 1031 and the second air duct 1032 are located below the reference plane R2 for example, a portion of the first air duct 1031 is located between the reference plane R2 and a portion of the second air duct 1032 for example, a portion of the second air duct 1032 is located between the reference plane R2 and a portion of the first air duct 1031 for example, and the optical axis LA1 of the light source 101 is parallel to the reference plane R2 for example. However, the invention is not such limited. Specifically, in the embodiment, the extending direction of the first air duct 1031 and the extending direction of the second air duct 1032 are not parallel to the reference plane R2 for example, but the invention is not limited thereto. In the embodiment, the projection direction P (i.e., the light axis LA2) of the projection beam L3 provided by the lens 12 of the projector 1 is parallel to the gravitational direction G. In such a use status of the embodiment, the first airflow blocking portion B1 of the first airflow control assembly 1033 can be controlled by gravity and rotated with the first control shaft CS1 as a rotation axis so that a portion of the first airflow passing portion P1 is rotated to be located on the passing path of the cooling airflow, thereby causing the first channel C1 of the first air duct 1031 to be in a non-communicating state and the second channel C2 to be in a communicating state. Meanwhile, the second airflow blocking portion B2 of the second airflow control assembly 1034 can be controlled by gravity and rotated with the second control shaft CS2 as a rotation axis so that a portion of the second airflow passing portion P2 is rotated to be located on the passing path of the cooling airflow, thereby causing the third channel C3 of the second air duct 1032 to be in a non-communicating state and the fourth channel C4 to be in a communicating state. Thus, in the embodiment, the cooling airflow provided by the fan 102 can flow to the light emitting element 1012 of the light source 101 individually via a portion of the first air duct 1031 and a portion of the second air duct 1032 to cool the light emitting element 1012. In the above embodiment, the projector 1 is exemplified by being fixed with respect to the reference plane R2. However, the projector 1 may be fixed to a table top or at other suitable positions, that is, the position where the projector is fixed is not limited in the invention.

In the embodiment shown in FIG. 8, hot air is accumulated at the right upper end and the left upper end of the light emitting element 1012 for example, so that the hot spot is located at the right upper end and the left upper end of the light emitting element 1012 for example. From above description, it is known that in the embodiment, the cooling airflow may flow to the right upper end and the left upper end of the light emitting element 1012 of the light source 101 shown in FIG. 8 via the second channel C2 of the first air duct 1031 in a communicating state and the fourth channel C4 of the second air duct 1032 in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 9:
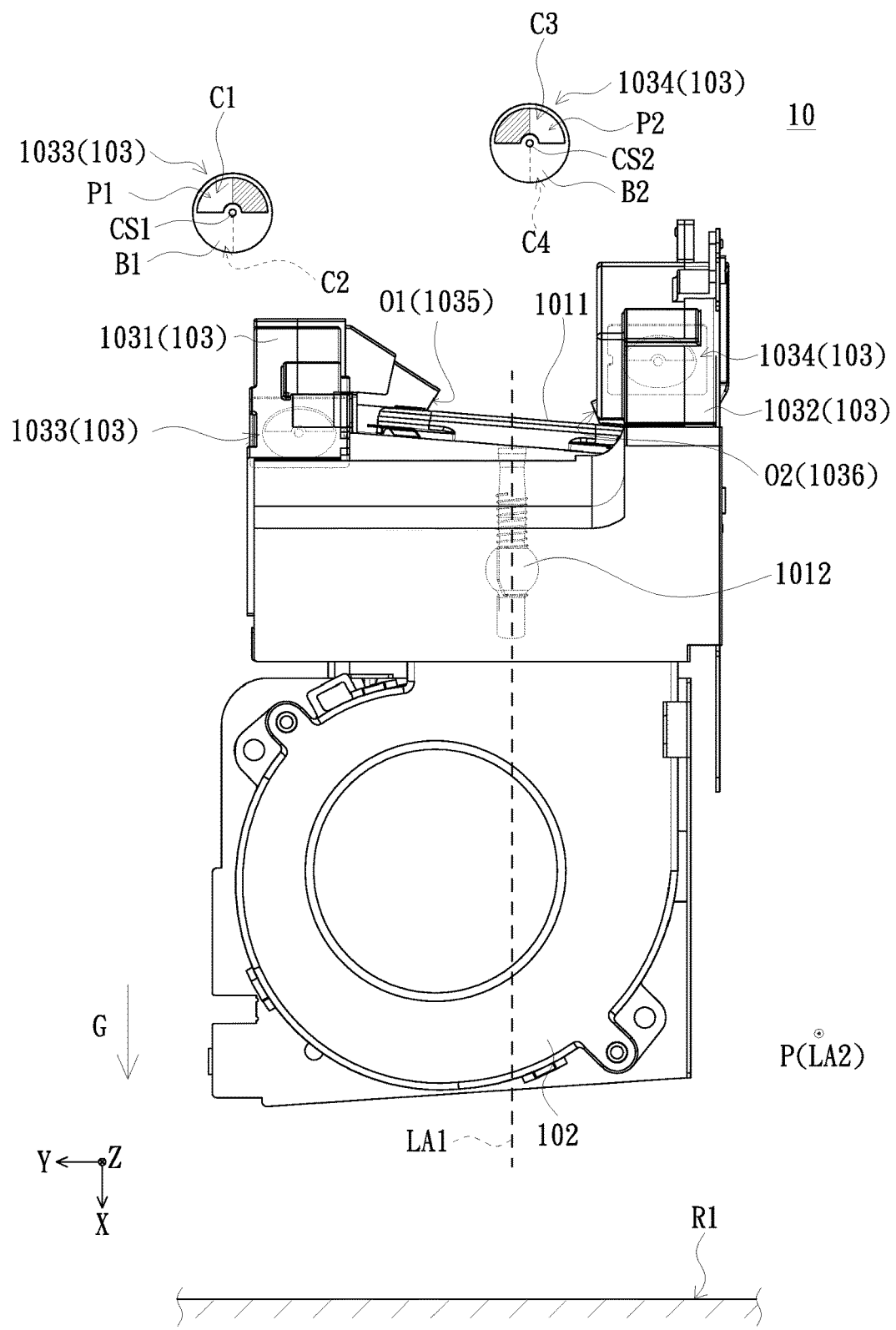
FIG. 9 is a schematic perspective structural view of the light source module shown in FIG. 3 in still another use status.

FIG. 9 is a schematic perspective structural view of the light source module shown in FIG. 3 in still another use status. Referring to FIGS. 1, 3 and 9, in the embodiment, when the projector 1 is fixed with respect to the reference plane R1 of a table top for example, the optical axis LA1 of the light source 101 is perpendicular to the reference plane R1 for example, but the invention is not limited thereto. Specifically, in the embodiment, the extending direction of the first air duct 1031 and the extending direction of the second air duct 1032 are not parallel to the reference plane R1 for example, but the invention is not limited thereto. In the embodiment, the projection direction P (i.e., the light axis LA2) of the projection beam L3 provided by the lens 12 of the projector 1 is perpendicular to the gravitational direction G. In such a use status of the embodiment, the first airflow blocking portion B1 of the first airflow control assembly 1033 can be controlled by gravity and rotated with the first control shaft CS1 as a rotation axis so that a portion of the first airflow passing portion P1 is rotated to be located on the passing path of the cooling airflow, thereby causing the first channel C1 of the first air duct 1031 to be in a communicating state and the second channel C2 to be in a non-communicating state. Meanwhile, the second airflow blocking portion B2 of the second airflow control assembly 1034 can be controlled by gravity and rotated with the second control shaft CS2 as a rotation axis so that a portion of the second airflow passing portion P2 is rotated to be located on the passing path of the cooling airflow, thereby causing the third channel C3 of the second air duct 1032 to be in a communicating state and the fourth channel C4 to be in a non-communicating state. Thus, in the embodiment, the cooling airflow provided by the fan 102 can flow to the light emitting element 1012 of the light source 101 individually via a portion of the first air duct 1031 and a portion of the second air duct 1032 to cool the light emitting element 1012. In the above embodiment, the projector 1 is exemplified by being fixed with respect to the reference plane R1. However, the projector 1 may be fixed to a ceiling or at other suitable positions, that is, the position where the projector is fixed is not limited in the invention.

In the embodiment shown in FIG. 9, hot air is accumulated at the right upper end and the left upper end of the light emitting element 1012 for example, so that the hot spot is located at the right upper end and the left upper end of the light emitting element 1012 for example. From above description, it is known that in the embodiment, the cooling airflow may flow to the right upper end and the left upper end of the light emitting element 1012 of the light source 101 shown in FIG. 9 via the first channel C1 of the first air duct 1031 in a communicating state and the third channel C3 of the second air duct 1032 in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 10:
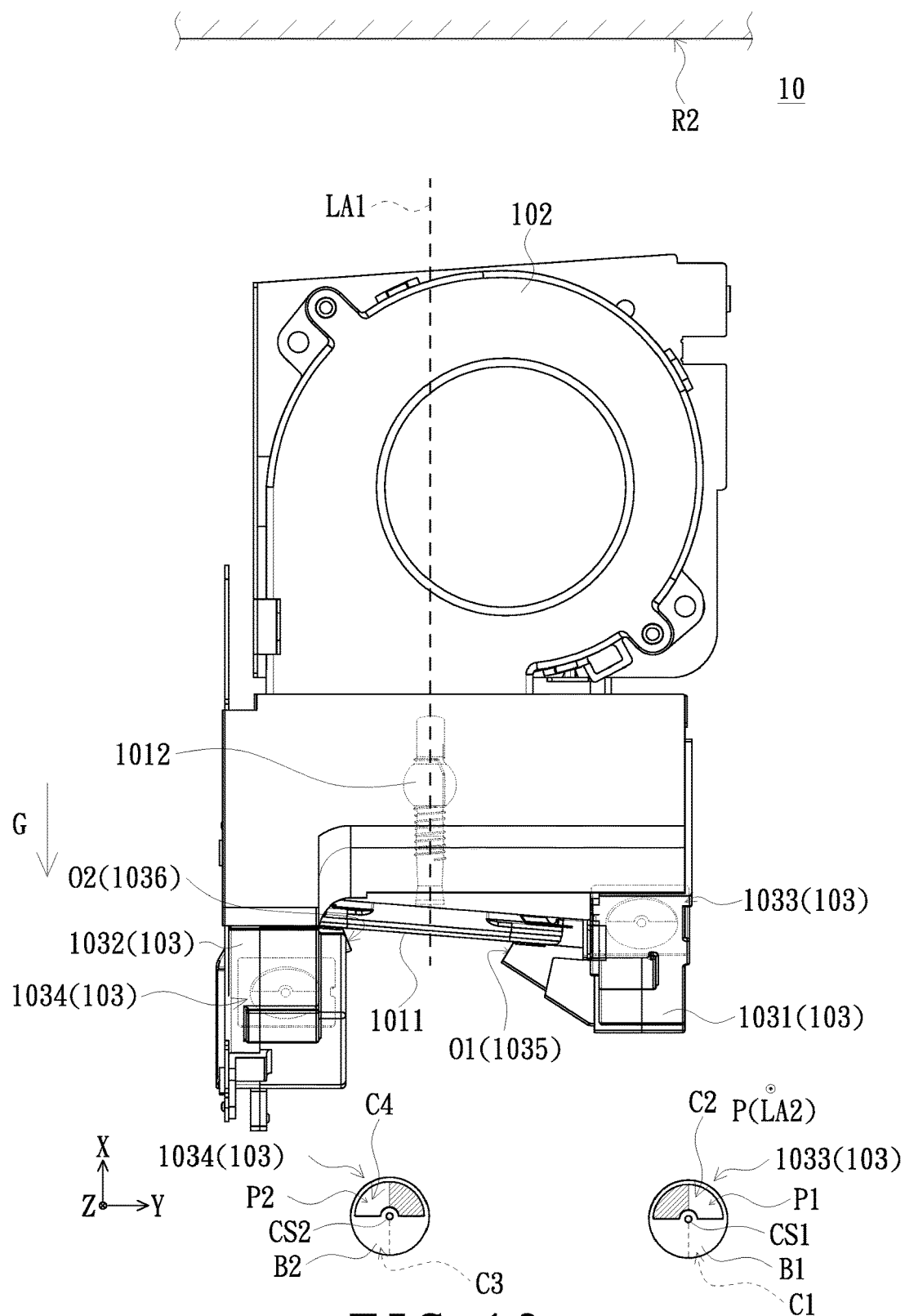
FIG. 10 is a schematic perspective structural view of the light source module shown in FIG. 3 in still another use status.

FIG. 10 is a schematic perspective structural view of the light source module shown in FIG. 3 in still another use status. Referring to FIGS. 1, 3 and 10, in the embodiment, when the projector 1 is fixed with respect to the reference plane R2 of a ceiling for example, the optical axis LA1 of the light source 101 is perpendicular to the reference plane R2 for example, but the invention is not limited thereto. Specifically, in the embodiment, the extending direction of the first air duct 1031 and the extending direction of the second air duct 1032 are not parallel to the reference plane R2 for example, but the invention is not limited thereto. In the embodiment, the projection direction P (i.e., the light axis LA2) of the projection beam L3 provided by the lens 12 of the projector 1 is perpendicular to the gravitational direction G. In such a use status of the embodiment, the first airflow blocking portion B1 of the first airflow control assembly 1033 can be controlled by gravity and rotated with the first control shaft CS1 as a rotation axis so that a portion of the first airflow passing portion P1 is rotated to be located on the passing path of the cooling airflow, thereby causing the first channel C1 of the first air duct 1031 to be in a non-communicating state and the second channel C2 to be in a communicating state. Meanwhile, the second airflow blocking portion B2 of the second airflow control assembly 1034 can be controlled by gravity and rotated with the second control shaft CS2 as a rotation axis so that a portion of the second airflow passing portion P2 is rotated to be located on the passing path of the cooling airflow, thereby causing the third channel C3 of the second air duct 1032 to be in a non-communicating state and the fourth channel C4 to be in a communicating state. Thus, in the embodiment, the cooling airflow provided by the fan 102 can flow to the light emitting element 1012 of the light source 101 individually via a portion of the first air duct 1031 and a portion of the second air duct 1032 to cool the light emitting element 1012. In the above embodiment, the projector 1 is exemplified by being fixed with respect to the reference plane R2. However, the projector 1 may be fixed to a table top or at other suitable positions, that is, the position where the projector is fixed is not limited in the invention.

In the embodiment shown in FIG. 10, hot air is accumulated at the right upper end and the left upper end of the light emitting element 1012 for example, so that the hot spot is located at the right upper end and the left upper end of the light emitting element 1012 for example. From above description, it is known that in the embodiment, the cooling airflow may flow to the right upper end and the left upper end of the light emitting element 1012 of the light source 101 shown in FIG. 10 via the second channel C2 of the first air duct 1031 in a communicating state and the fourth channel C4 of the second air duct 1032 in a communicating state, causing the effect of cooling the hot spot of the light source module 10, thus avoiding the thermal unevenness of the light emitting element 1012 and further effectively improving the lifetime of the light emitting element 1012 of the light source 101 of the light source module 10.

Figure 11A:
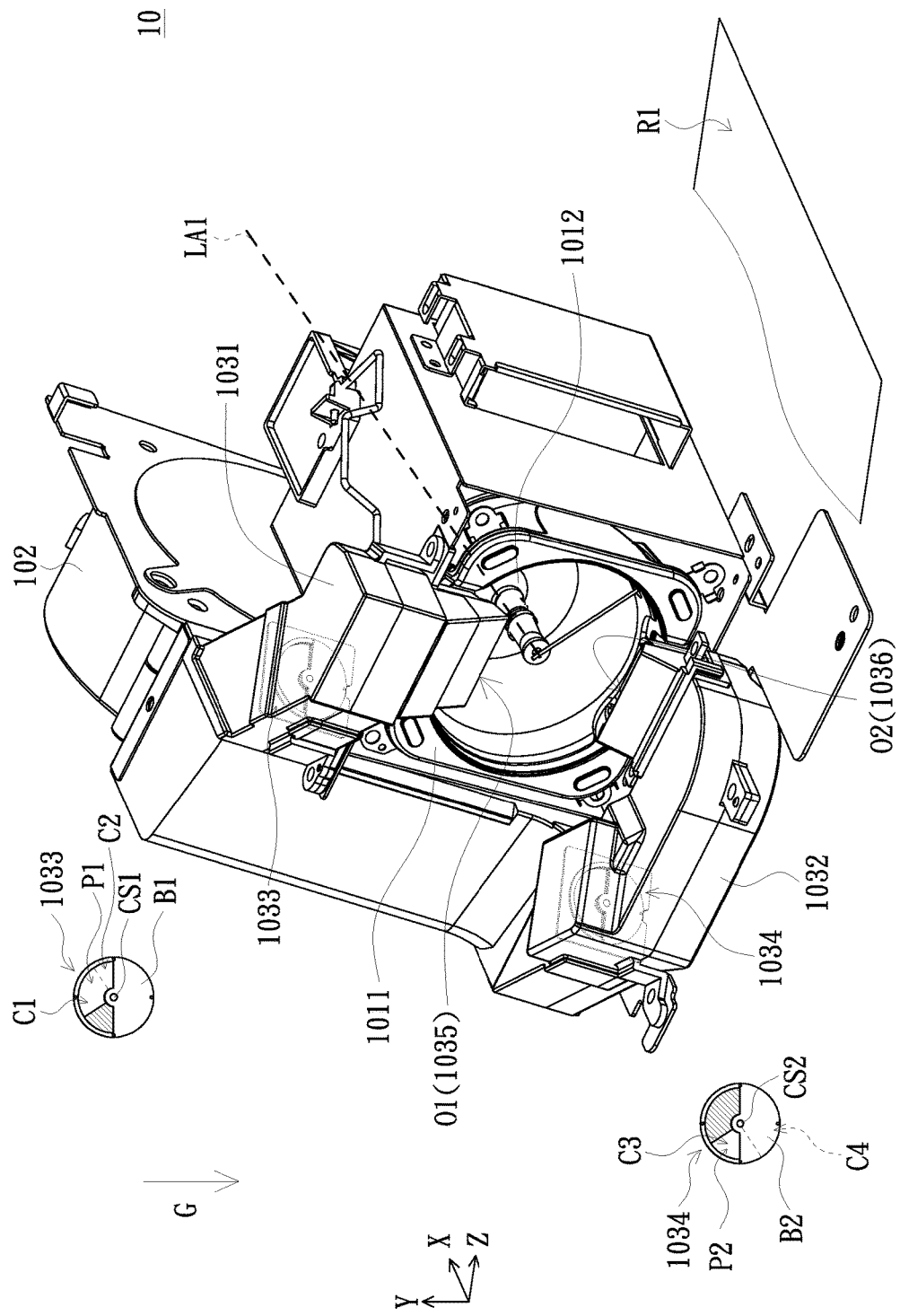
FIGS. 11A and 11B are schematic perspective structural views of the light source module shown in FIG. 3 in another two use statuses.
Figure 11B:
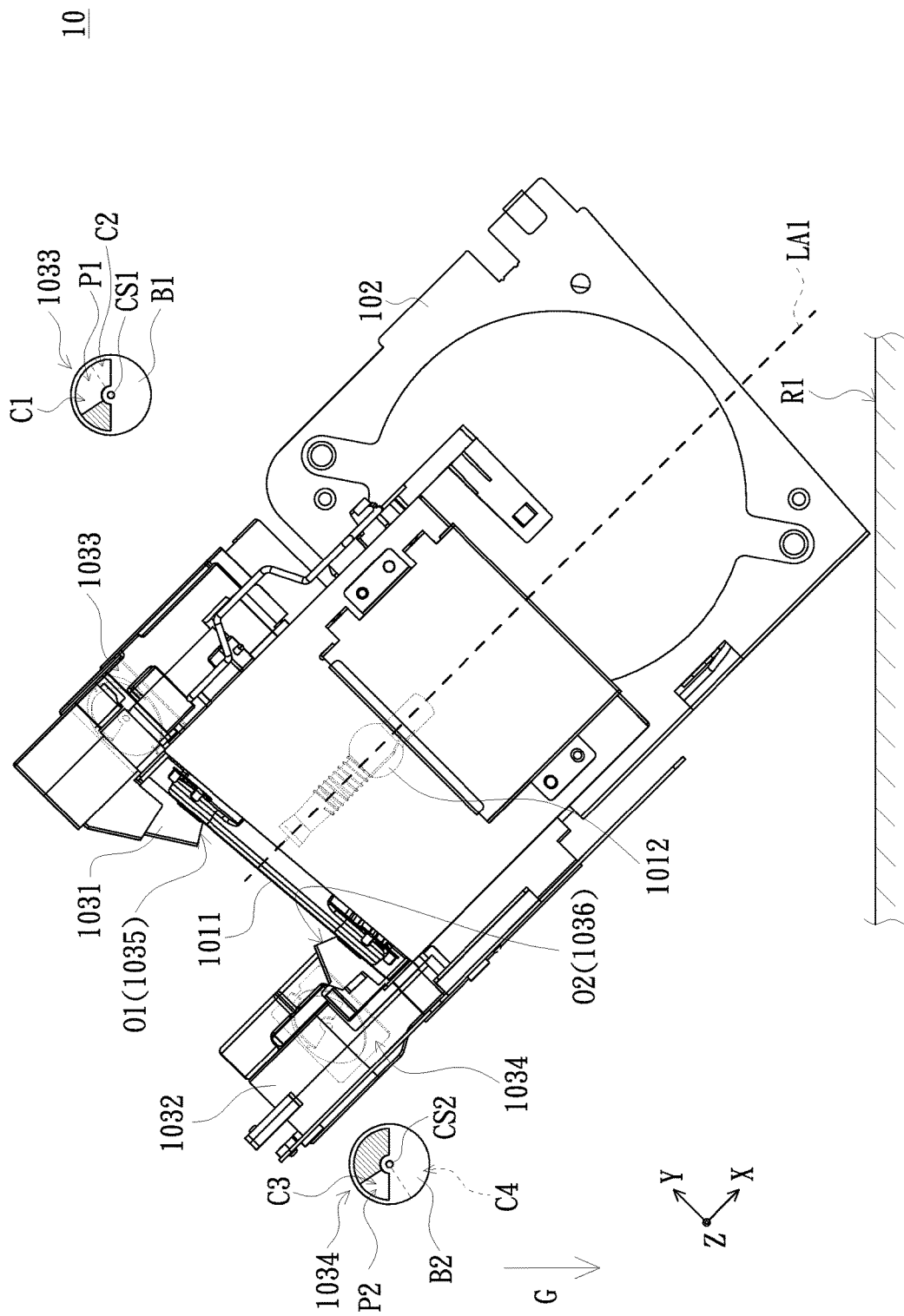

FIGS. 11A and 11B are schematic perspective structural views of the light source module shown in FIG. 3 in another two use statuses. Referring first to FIGS. 1, 3 and 11A, in the embodiment, the angle between the optical axis LA1 and the reference plane R1 is 45 degrees for example. In such a use status of the embodiment, the first airflow blocking portion B1 of the first airflow control assembly 1033 can be controlled by gravity and rotated with the first control shaft CS1 as a rotation axis so that a portion of the first airflow passing portion P1 is rotated to be located on the passing path of the cooling airflow and the first airflow blocking portion B1 covers a portion of the second channel C2 of the first air duct 1031, thereby causing the first channel C1 and a portion of the second channel C2 of the first air duct 1031 to be in a communicating state. Meanwhile, the second airflow blocking portion B2 of the second airflow control assembly 1034 can be controlled by gravity and rotated with the second control shaft CS2 as a rotation axis so that a portion of the second airflow passing portion P2 is rotated to be located on the passing path of the cooling airflow and the second airflow blocking portion B2 covers the fourth channel C4 and a portion of the third channel C3 of the second air duct 1032, thereby causing a portion of the third channel C3 of the second air duct 1032 to be in a communicating state and the fourth channel C4 to be in a non-communicating state. Thus, in the embodiment, the cooling airflow provided by the fan 102 can flow to the light emitting element 1012 of the light source 101 individually via a portion of the first air duct 1031 and a portion of the second air duct 1032 to cool the light emitting element 1012. Similarly, as shown in FIG. 11B, in another embodiment where the angle between the optical axis LA1 and the reference plane R1 is also 45 degrees, the heat dissipation similar to that of FIG. 11A is also achieved.

However, the angle between the optical axis LA1 and the reference plane R1 shown in FIGS. 11A-11B is not limited to the range of greater than 0 and less than 90 degrees. In other embodiments, the angle between the optical axis LA1 and the reference plane R1 is, for example, greater than 90 degrees and less than 180 degrees. More specifically, in the embodiment that the angle between the optical axis LA1 and the reference plane is 135 degrees, the first airflow blocking portion B1 of the first airflow control assembly 1033 can be controlled by gravity and rotated to be located on the passing path of the cooling airflow with the first control shaft CS1 as a rotation axis so that the first airflow blocking portion B1 covers the second channel C2 and a portion of the first channel C1 of the first air duct 1031, thereby causing a portion of the first channel C1 of the first air duct 1031 to be in a communicating state and the second channel C2 to be in a non-communicating state. Meanwhile, the second airflow blocking portion B2 of the second airflow control assembly 1034 can be controlled by gravity and rotated to be located on the passing path of the cooling airflow with the second control shaft CS2 as a rotation axis so that the first airflow blocking portion B1 covers a portion of the fourth channel C4 of the second air duct 1032, thereby causing the third channel C3 and a portion of the fourth channel C4 of the second air duct 1032 to be in a communicating state.

Figure 12:
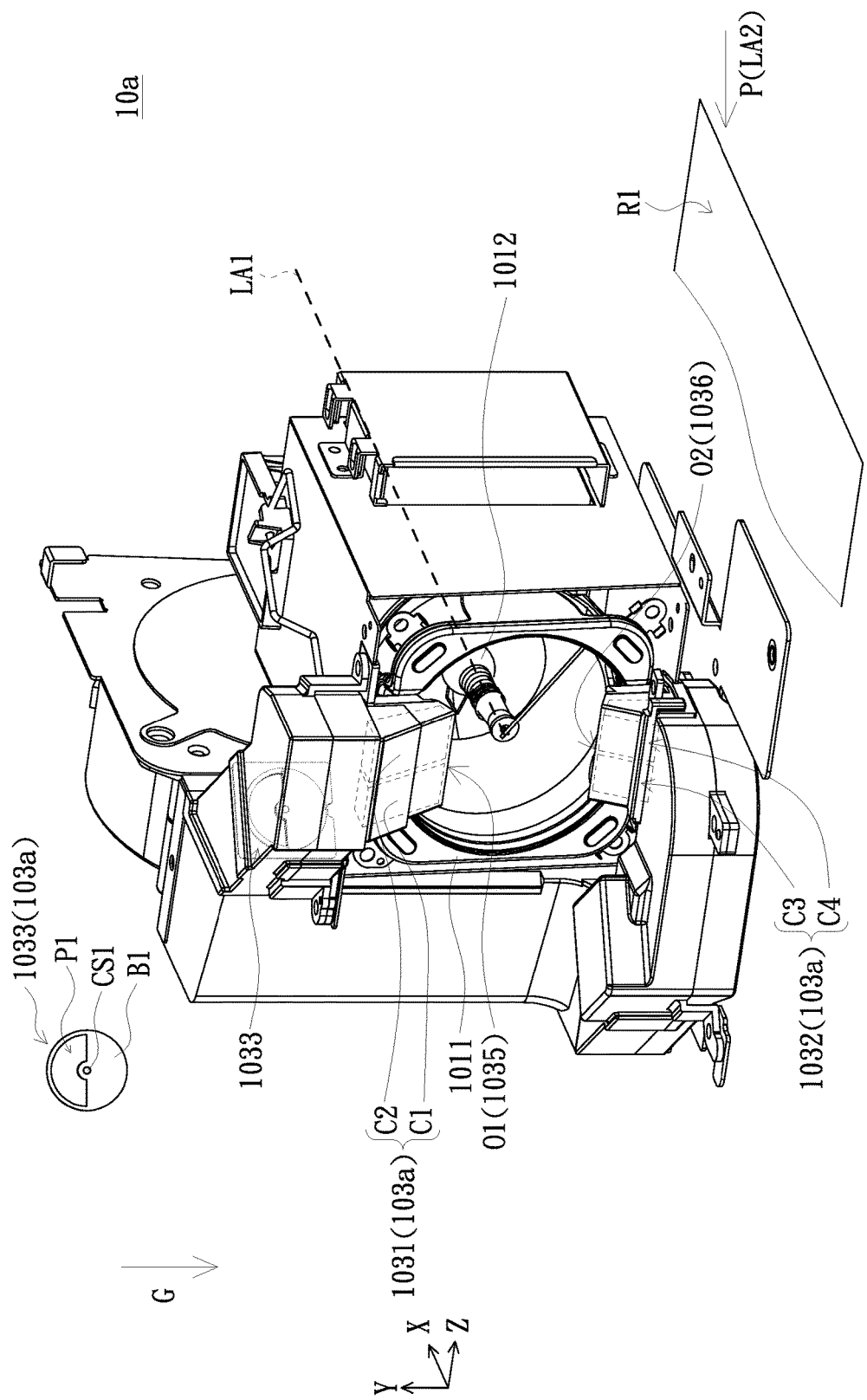
FIG. 12 is a schematic perspective structural view of a light source module in a use status in accordance with another embodiment of the invention.

FIG. 12 is a schematic perspective structural view of a light source module in a use status in accordance with another embodiment of the invention. The light source module 10a of the embodiment is similar to the light source modules 10 shown in FIGS. 5 to 11, and the main difference is that the light source module 10a of the embodiment is configured such that only the first air duct 1031 of the deflector 103a is provided with a first airflow control assembly 1033 therein. That is, in the embodiment, the second air duct 1032 of the deflector 103a is not provided with any component for blocking the flow of air. As shown in FIG. 12, in the embodiment, when the projector 1 shown in FIG. 1 is fixed with respect to the reference plane R1 of a table top for example, the second air duct 1032 of the deflector 103 is located between the reference plane R1 and the optical axis LA1 of the light source 101 for example, and the optical axis LA1 of the light source 101 is parallel to the reference plane R1 for example. Specifically, in the embodiment, the second air duct 1032 is located between the reference plane R1 and the first air duct 1031 for example, the extending direction of a portion of the first air duct 1031 and the extending direction of a portion of the second air duct 1032 are substantially parallel to the reference plane R1 for example, and the projection direction P (i.e., the light axis LA2) of the projection beam L3 provided by the lens 12 shown in FIG. 1 is perpendicular to the gravitational direction G. However, the present invention is not such limited. In such a use status of the embodiment, the first airflow blocking portion B1 of the first airflow control assembly 1033 can be controlled by gravity and rotated with the first control shaft CS1 as a rotation axis so that the first airflow passing portion P1 is rotated to be located on the passing path of the cooling airflow, thereby causing the first air duct 1031 to be in a communicating state. Meanwhile, since the second air duct 1032 does not have any component for blocking the flow of air, the second air duct 1032 is in a communicating state. Thus, in the embodiment, the cooling airflow provided by the fan 102 can flow to the light emitting element 1012 of the light source 101 individually via the first air duct 1031 and the second air duct 1032 to cool the light emitting element 1012. In the above embodiment, the projector 1 is exemplified by being fixed with respect to the reference plane R1. However, the projector 1 may be fixed to a ceiling or at other suitable positions, that is, the position where the projector is fixed is not limited in the invention.

Figure 13:
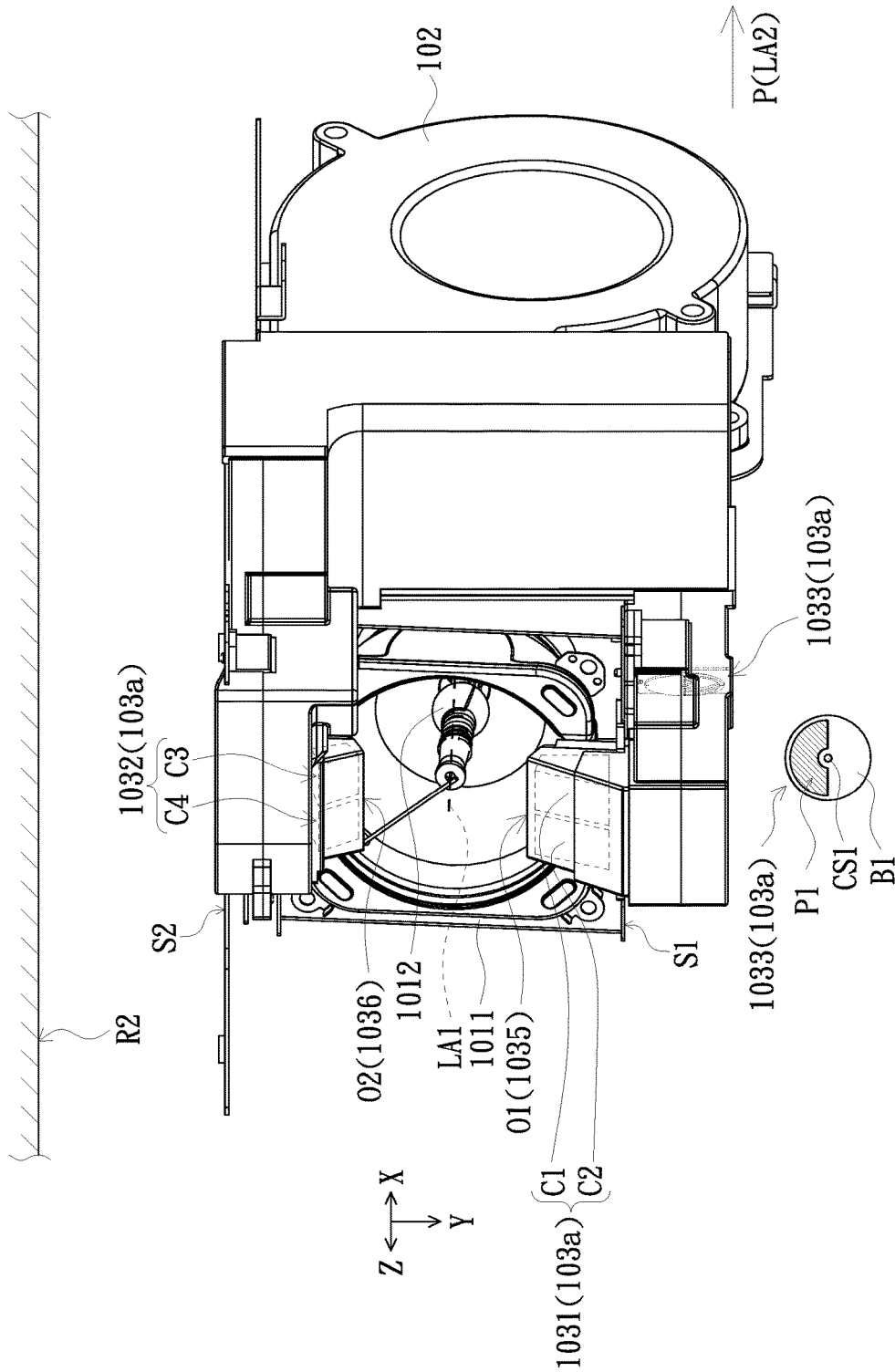
FIG. 13 is a schematic perspective structural view of the light source module shown in FIG. 12 in another use status.

FIG. 13 is a schematic perspective structural view of the light source module shown in FIG. 12 in another use status. In the embodiment, when the projector 1 shown in FIG. 1 is fixed with respect to the reference plane R2 of a ceiling for example, the second air duct 1032 of the deflector 103 is located between the reference plane R2 and the optical axis LA1 of the light source 101 for example, and the optical axis LA1 of the light source 101 is parallel to the reference plane R2 for example. Specifically, in the embodiment, the second air duct 1032 is located between the reference plane R2 and the first air duct 1031 for example, the extending direction of a portion of the first air duct 1031 and the extending direction of a portion of the second air duct 1032 are substantially parallel to the reference plane R2 for example, and the projection direction P (i.e., the light axis LA2) of the projection beam L3 provided by the lens 12 shown in FIG. 1 is perpendicular to the gravitational direction G. However, the present invention is not such limited. In such a use status of the embodiment, the first airflow blocking portion B1 of the first airflow control assembly 1033 can be controlled by gravity and rotated to be located on the passing path of the cooling airflow with the first control shaft CS1 as a rotation axis, thereby causing the first air duct 1031 to be in a non-communicating state. Meanwhile, since the second air duct 1032 does not have any component for blocking the flow of air therein, the second air duct 1032 is in a communicating state. Thus, in the embodiment, the cooling airflow provided by the fan 102 can flow to the light emitting element 1012 of the light source 101 individually via the second air duct 1032 to cool the light emitting element 1012.

Figure 14:
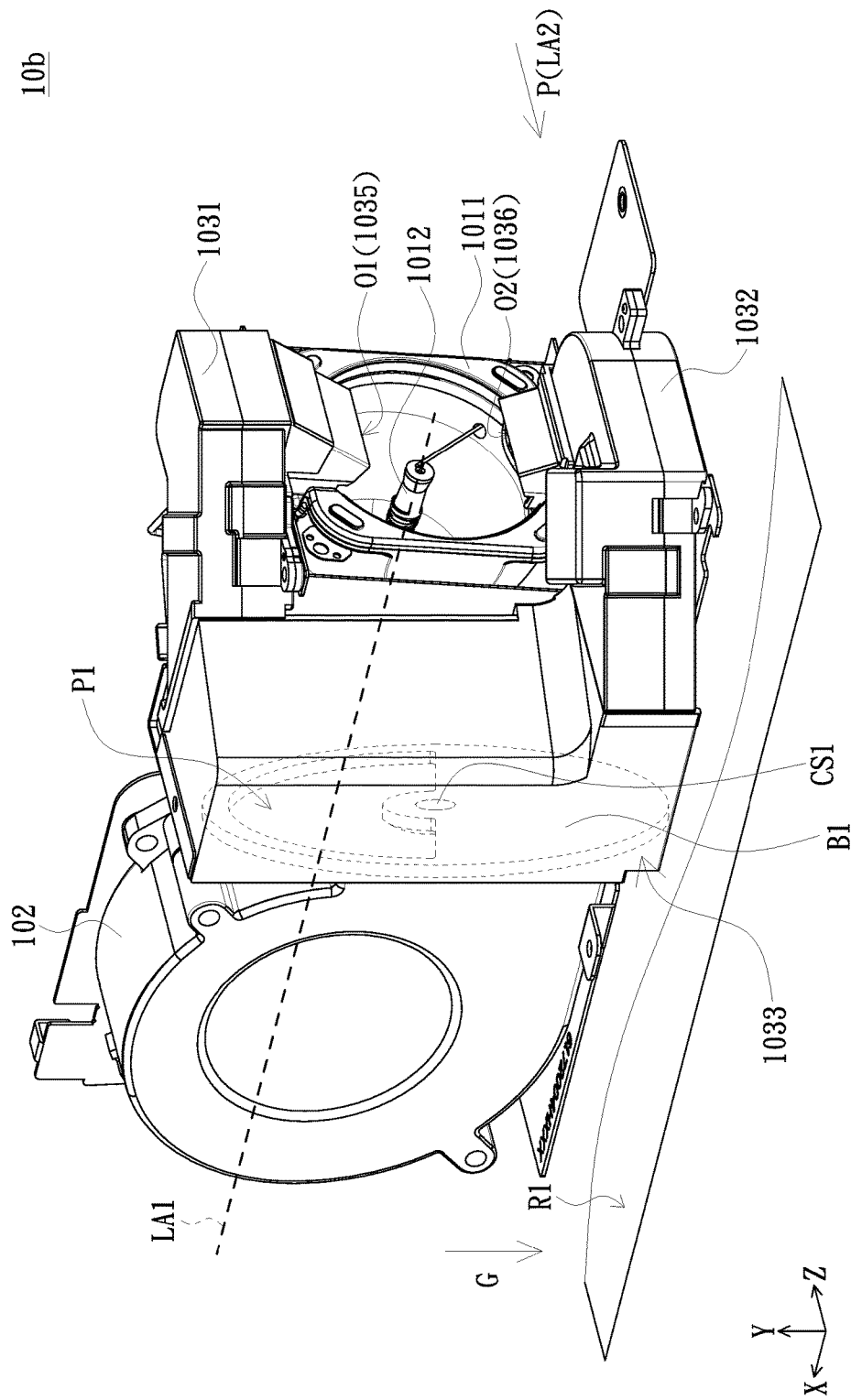
FIG. 14 is a schematic perspective structural view of a light source module in accordance with another embodiment of the invention.

FIG. 14 is a schematic perspective structural view of a light source module in accordance with another embodiment of the invention. As shown in FIG. 14, the light source module 10b of the embodiment is similar to the light source modules 10 shown in FIGS. 2 and 3, and the main difference is that the first airflow control assembly 1033 of the light source module 10b of the embodiment is disposed between the fan 102 and the first air duct 1031, and the first airflow control assembly 1033 is also disposed between the fan 102 and the second air duct 1032. From another point of view, in the embodiment, the first airflow control assembly 1033 is located outside the first air duct 1031 and also outside the second air duct 1032. In the embodiment, when the second air duct 1032 is in a non-communicating state, the first airflow control assembly 1033 may block the cooling airflow from flowing from the fan 102 to the light source 101 (shown in FIG. 2) so that the cooling airflow can flow from the fan 102 to the light source 101 without via the second air duct 1032. When the second air duct 1032 is in a communicating state, the first airflow passing portion P1 may be located on the passing path of the cooling airflow so that the cooling airflow may flow from the fan 102 to the light source 101 via the second air duct 1032. In addition, the architecture of the light source module 10b of the embodiment can be used for the use statuses shown in FIGS. 5 to 11 and is exemplified as follow. For example, when the light source module 10b is fixed with respect to the reference plane R1 of a table top in the use status of FIG. 5 for example, the first air duct 1031 is in a communicating state and the second air duct 1032 is in a non-communicating state, so that the cooling airflow provided by the fan 102 can flow to the light emitting element 1012 of the light source 101 via the first air duct 1031 to cool the light emitting element 1012. From another point of view, in the embodiment that the architecture of FIG. 14 is applied under the use status of FIG. 5, when the second air duct 1032 is in a non-communicating state, the first airflow control assembly 1033 may block the cooling airflow from flowing from the fan 102 to the light emitting element 1012 of the light source 101, so that the cooling airflow can flow from the fan 102 to the light source 101 without via the second air duct 1032. For example, when the light source module 10b is fixed with respect to the reference plane R2 of a ceiling in the use status of FIG. 6 for example, the first air duct 1031 is in a non-communicating state and the second air duct 1032 is in a communicating state, so that the cooling airflow provided by the fan 102 can flow to the light emitting element 1012 of the light source 101 via the second air duct 1032 to cool the light emitting element 1012. For example, when the light source module 10b is fixed with respect to the reference plane R1 of a table top and the projection direction P of the projection beam L3 provided by the lens 12 is parallel to the gravitational direction G in the use status of FIG. 7 for example, the first channel C1 of the first air duct 1031 is in a communicating state and the second channel C2 is in a non-communicating state, and the third channel C3 of the second air duct 1032 is in a communicating state and the fourth channel C4 is in a non-communicating state, so that the cooling airflow provided by the fan 102 can flow to the light emitting element 1012 of the light source 101 individually via a portion of the first air duct 1031 and a portion the second air duct 1032 to cool the light emitting element 1012. For example, when the light source module 10b is fixed with respect to the reference plane R2 of a ceiling and the projection direction P of the projection beam L3 provided by the lens 12 is parallel to the gravitational direction G in the use status of FIG. 8 for example, the first channel C1 of the first air duct 1031 is in a non-communicating state and the second channel C2 is in a communicating state, and the third channel C3 of the second air duct 1032 is in a non-communicating state and the fourth channel C4 is in a communicating state, so that the cooling airflow provided by the fan 102 can flow to the light emitting element 1012 of the light source 101 individually via a portion of the first air duct 1031 and a portion the second air duct 1032 to cool the light emitting element 1012. For example, when the light source module 10b is fixed with respect to the reference plane R1 of a table top and the projection direction P of the projection beam L3 provided by the lens 12 is perpendicular to the gravitational direction G in the use status of FIG. 9 for example, the first channel C1 of the first air duct 1031 is in a communicating state and the second channel C2 is in a non-communicating state, and the third channel C3 of the second air duct 1032 is in a communicating state and the fourth channel C4 is in a non-communicating state, so that the cooling airflow provided by the fan 102 can flow to the light emitting element 1012 of the light source 101 individually via a portion of the first air duct 1031 and a portion the second air duct 1032 to cool the light emitting element 1012. For example, when the light source module 10b is fixed to the reference plane R2 of a ceiling and the projection direction P of the projection beam L3 provided by the lens 12 is perpendicular to the gravitational direction G in the use status of FIG. 10 for example, the first channel C1 of the first air duct 1031 is in a non-communicating state and the second channel C2 is in a communicating state, and the third channel C3 of the second air duct 1032 is in a non-communicating state and the fourth channel C4 is in a communicating state, so that the cooling airflow provided by the fan 102 can flow to the light emitting element 1012 of the light source 101 individually via a portion of the first air duct 1031 and a portion the second air duct 1032 to cool the light emitting element 1012. For example, when the light source module 10b is fixed with respect to the reference plane R1 of a table top and the angle between the optical axis LA1 of the light source 101 and the reference plane R1 is greater than 0 and less than 90 degrees in the use statuses of FIGS. 11A-11B for example, the first airflow blocking portion B1 covers a portion of the second channel C2 of the first air duct 1031 and the fourth channel C4 and a portion of the third channel C3 of the second air duct 1032, thereby causing the first channel C1 and a portion of the second channel C2 of the first air duct 1031 to be both in a communicating state and causing a portion of the third channel C3 of the second air duct 1032 to be in a communicating state and the fourth channel C4 to be in a non-communicating state, so that the cooling airflow provided by the fan 102 can flow to the light emitting element 1012 of the light source 101 individually via a portion of the first air duct 1031 and a portion the second air duct 1032 to cool the light emitting element 1012. From another point of view, in the embodiment that the architecture of FIG. 14 is applied under the use statuses of FIGS. 11A-11B, when the second air duct 1032 is in a communicating state, the first airflow passing portion P1 may be located on the passing path of the cooling airflow, so that the cooling airflow flow from the fan 102 to the light emitting element 1012 of the light source 101 via a portion of the first air duct 1031 and a portion of the second air duct 1032.

In summary, according to the projector of the embodiment of the invention, the light source module has a first airflow control assembly for controlling the first air duct to be in a communicating state or a non-communicating state. By the design in which the first control shaft of the first airflow control assembly is inclined to the optical axis so that the angle between the first control shaft and the optical axis is greater than 0 and less than 90 degrees, the cooling airflow provided by the fan can be directed to the light source module in various use statuses. As a result, the projector can cause a desired cooling effect on the light source module in a variety of different use statuses, thereby increasing the lifetime of the light source module and the projector.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first stop part, the second stop part, the first ring part and the second ring part are only used for distinguishing various elements and do not limit the number of the elements.

What is claimed is:

1. A projector, comprising:
    a light source module, comprising;
        a light source, having an optical axis and providing an illumination beam;
        a fan, configured to provide a cooling airflow; and
        a deflector, disposed between the light source and the fan and configured to direct a flowing direction of the cooling airflow, the deflector comprising:
            a first air duct, connected between a first side of the light source and an air outlet of the fan;
            a second air duct, connected between a second side of the light source and the air outlet of the fan; and
            a first airflow control assembly, configured to control the first air duct to be in a communicating state or a non-communicating state and have a first control shaft and a first airflow passing portion, wherein the first airflow passing portion is configured to rotate about the first control shaft, and the first control shaft is inclined toward the optical axis so that a first angle greater than 0 and less than 90 degrees is formed between the first control shaft and the optical axis, wherein when the first air duct is in the communicating state, the first airflow passing portion is located on a passing path of the cooling airflow so that the cooling airflow flows from the fan to the light source via the first air duct;
    a light valve, located on a transmission path of the illumination beam and configured to convert the illumination beam into an image beam; and
    a lens, located on a transmission path of the image beam, wherein the image beam converts to a projection beam after passing through the lens.

2. The projector according to claim 1, wherein the first airflow control assembly has a first airflow blocking portion, the first airflow blocking portion is configured to rotate about the first control shaft, and the first airflow blocking portion and the first airflow passing portion are both positioned around the first control shaft.

3. The projector according to claim 1, wherein the first airflow control assembly is disposed between the fan and the first air duct and between the fan and the second air duct.

4. The projector according to claim 1, wherein when the first air duct is in the non-communicating state, the first airflow control assembly blocks the cooling airflow from the fan from flowing to the light source so that the cooling airflow from the fan does not flow to the light source via the first air duct, wherein when the second air duct is in the communicating state, the first airflow passing portion is located on the passing path of the cooling airflow so that the cooling airflow from the fan flows to the light source via the second air duct, or wherein when the second air duct is in the non-communicating state, the first airflow control assembly blocks the cooling airflow from the fan from flowing to the light source so that the cooling airflow from the fan does not flow to the light source via the second air duct.

5. The projector according to claim 1, wherein the projector is configured to be fixed with respect to a reference plane and the optical axis is substantially parallel to or perpendicular to the reference plane, wherein the second air duct is in the non-communicating state when the first air duct is in the communicating state, wherein the second air duct is in the communicating state when the first air duct is in the non-communicating state, or wherein the second air duct is in the communicating state when the first air duct is in the communicating state.

6. The projector according to claim 1, wherein the deflector further comprises:
    a second airflow control assembly, configured to control the second air duct to be in the communicating state or the non-communicating state and to have a second control shaft, a second airflow passing portion and a second airflow blocking portion, wherein the second airflow passing portion is configured to rotate about the second control shaft, the second airflow blocking portion is configured to rotate about the second control shaft, the second airflow blocking portion and the second airflow passing portion are both positioned around the second control shaft, the second control shaft is inclined toward the optical axis so that a second angle greater than 0 and less than 90 degrees is formed between the second control shaft and the optical axis, wherein when the second air duct is in the communicating state, the second airflow passing portion is located on the passing path of the cooling airflow so that the cooling airflow from the fan flows to the light source via the second air duct.

7. The projector according to claim 6, wherein the first airflow control assembly is disposed in the first air duct and the second airflow control assembly is disposed in the second air duct.

8. The projector according to claim 6, wherein when the first air duct is in the non-communicating state, the first airflow control assembly blocks the cooling airflow from the fan from flowing to the light source so that the cooling airflow from the fan does not flow to the light source via the first air duct, wherein when the second air duct is in the communicating state, the second airflow passing portion of the second airflow control assembly is located on the passing path of the cooling airflow so that the cooling airflow from the fan flows to the light source via the second air duct, or wherein when the second air duct is in the non-communicating state, the second airflow control assembly blocks the cooling airflow from the fan from flowing to the light source so that the cooling airflow from the fan does not flow to the light source via the second air duct.

9. The projector according to claim 6, wherein the first angle and the second angle are 45 degrees.

10. The projector according to claim 6, wherein the first airflow blocking portion is a first rotary member pivotally connected to the first control shaft, and the second airflow blocking portion is a second rotary member pivotally connected to the second control shaft.

11. The projector according to claim 6, wherein the first airflow blocking portion and the first airflow passing portion constitute a first rotary member, the second airflow blocking portion and the second airflow passing portion constitute a second rotary member, and the first rotary member and the second rotary member are pivotally connected to the first control shaft and the second control shaft respectively.

12. The projector according to claim 6, wherein by gravity or a driving motor, the first airflow control assembly controls the first air duct to be in the communicating state or to be in the non-communicating state and the second airflow control assembly controls the second air duct to be in the communicating state or to be in the non-communicating state.

13. The projector according to claim 6, wherein the first control shaft extends in a direction parallel to a flowing direction of the cooling airflow in the first air duct and the second control shaft extends in a direction parallel to a flowing direction of the cooling airflow in the second air duct.

14. The projector according to claim 1, wherein the first air duct comprises a first channel and a second channel, an air outlet of the first channel and an air outlet of the second channel being positioned respectively at opposite sides of the optical axis, and the second air duct comprises a third channel and a fourth channel, an air outlet of the third channel and an air outlet of the fourth channel being positioned respectively at the opposite sides of the optical axis, with the air outlet of the first channel being opposite to the air outlet of the third channel and the air outlet of the second channel being opposite to the air outlet of the fourth channel.

15. The projector according to claim 1, wherein the deflector further comprises:

a first deflector unit, disposed between the first air duct and the light source and having a first air outlet portion, wherein the first air outlet portion is directed to the light source; and a second deflector unit, disposed between the second air duct and the light source and having a second air outlet portion, wherein the second air outlet portion is directed to the light source.

16. The projector according to claim 1, wherein the light source comprises a housing and a light emitting element disposed in the housing, the housing has at least one opening, the cooling airflow is directed to the light emitting element in the housing through the deflector and then evacuated via the at least one opening.

17. The projector according to claim 16, wherein the first air duct and the second air duct are respectively connected to opposite sides of the housing of the light source or respectively connected to adjacent sides of the housing of the light source.

18. A light source module used for a projector, the light source module comprising:

a light source, having an optical axis;
a fan, providing a cooling airflow; and
a deflector, disposed between the light source and the fan and configured to direct a flowing direction of the cooling airflow, the deflector comprising:
a first air duct, connected between a first side of the light source and an air outlet of the fan;
a second air duct, connected between a second side of the light source and the air outlet of the fan; and
a first airflow control assembly, configured to control the first air duct to be in a communicating state or a non-communicating state and to have a first control shaft and a first airflow passing portion, wherein the first airflow passing portion is configured to rotate about the first control shaft, the first control shaft is inclined toward the optical axis so that a first angle greater than 0 and less than 90 degrees is formed between the first control shaft and the optical axis, wherein when the first air duct is in the communicating state, the first airflow passing portion is located on a passing path of the cooling airflow so that the cooling airflow from the fan flows to the light source via the first air duct.

19. The light source module according to claim 18, wherein the first airflow control assembly has a first airflow blocking portion, the first airflow blocking portion is configured to rotate about the first control shaft, and the first airflow blocking portion and the first airflow passing portion are both positioned around the first control shaft.

20. The light source module according to claim 18, wherein the first airflow control assembly is disposed between the fan and the first air duct and between the fan and the second air duct.

21. The light source module according to claim 18, wherein when the first air duct is in the non-communicating state, the first airflow control assembly blocks the cooling airflow from the fan from flowing to the light source so that the cooling airflow from the fan does not flow to the light source via the first air duct, wherein when the second air duct is in the communicating state, the first airflow passing portion is located on the passing path of the cooling airflow so that the cooling airflow from the fan flows to the light source via the second air duct, or wherein when the second air duct is in the non-communicating state, the first airflow control assembly blocks the cooling airflow from the fan from flowing to the light source so that the cooling airflow from the fan does not flow to the light source via the second air duct.

22. The light source module according to claim 18, wherein the projector is configured to be fixed with respect to a reference plane and the optical axis is substantially parallel to or perpendicular to the reference plane, wherein the second air duct is in the non-communicating state when the first air duct is in the communicating state, wherein the second air duct is in the communicating state when the first air duct is in the non-communicating state, or wherein the second air duct is in the communicating state when the first air duct is in the communicating state.

23. The light source module according to claim 18, wherein the deflector further comprises:
  a second airflow control assembly, configured to control the second air duct to be in the communicating state or the non-communicating state and to have a second control shaft, a second airflow passing portion and a second airflow blocking portion, wherein the second airflow passing portion is configured to rotate about the second control shaft, the second airflow blocking portion is configured to rotate about the second control shaft, the second airflow blocking portion and the second airflow passing portion are both positioned around the second control shaft, the second control shaft is inclined toward the optical axis so that a second angle greater than 0 and less than 90 degrees is formed between the second control shaft and the optical axis, wherein when the second air duct is in the communicating state, the second airflow passing portion is located on the passing path of the cooling airflow so that the cooling airflow from the fan flows to the light source via the second air duct.

24. The light source module according to claim 23, wherein the first airflow control assembly is disposed in the first air duct and the second airflow control assembly is disposed in the second air duct.

25. The light source module according to claim 23, wherein when the first air duct is in the non-communicating state, the first airflow control assembly blocks the cooling airflow from the fan from flowing to the light source so that the cooling airflow from the fan does not flow to the light source via the first air duct, wherein when the second air duct is in the communicating state, the second airflow passing portion of the second airflow control assembly is located on the passing path of the cooling airflow so that the cooling airflow from the fan flows to the light source via the second air duct, or wherein when the second air duct is in the non-communicating state, the second airflow control assembly blocks the cooling airflow from the fan from flowing to the light source so that the cooling airflow from the fan does not flow to the light source via the second air duct.

26. The light source module according to claim 23, wherein the first angle and the second angle are 45 degrees.

27. The light source module according to claim 23, wherein the first airflow blocking portion is a first rotary member pivotally connected to the first control shaft, and the second airflow blocking portion is a second rotary member pivotally connected to the second control shaft.

28. The light source module according to claim 23, wherein the first airflow blocking portion and the first airflow passing portion constitute a first rotary member, the second airflow blocking portion and the second airflow passing portion constitute a second rotary member, and the first rotary member and the second rotary member are pivotally connected to the first control shaft and the second control shaft respectively.

29. The light source module according to claim 23, wherein by gravity or a driving motor, the first airflow control assembly controls the first air duct to be in the communicating state or to be in the non-communicating state and the second airflow control assembly controls the second air duct to be in the communicating state or to be in the non-communicating state.

30. The light source module according to claim 23, wherein the first control shaft extends in a direction parallel to a flowing direction of the cooling airflow in the first air duct and the second control shaft extends in a direction parallel to a flowing direction of the cooling airflow in the second air duct.

31. The light source module according to claim 18, wherein the first air duct comprises a first channel and a second channel, an air outlet of the first channel and an air outlet of the second channel being positioned respectively at opposite sides of the optical axis, and the second air duct comprises a third channel and a fourth channel, an air outlet of the third channel and an air outlet of the fourth channel being positioned respectively at the opposite sides of the optical axis, with the air outlet of the first channel being opposite to the air outlet of the third channel and the air outlet of the second channel being opposite to the air outlet of the fourth channel.

32. The light source module according to claim 18, wherein the deflector further comprises:
  a first deflector unit, disposed between the first air duct and the light source and having a first air outlet portion, wherein the first air outlet portion is directed to the light source; and
  a second deflector unit, disposed between the second air duct and the light source and having a second air outlet portion, wherein the second air outlet portion is directed to the light source.

33. The light source module according to claim 18, wherein the light source comprises a housing and a light emitting element disposed in the housing, the housing has at least one opening, the cooling airflow is directed to the light emitting element in the housing through the deflector and then evacuated via the at least one opening.

34. The light source module according to claim 33, wherein the first air duct and the second air duct are respectively connected to opposite sides of the housing of the light source or respectively connected to adjacent sides of the housing of the light source.

* * * * *